United States Patent [19]
Federico et al.

[11] Patent Number: 5,745,156
[45] Date of Patent: Apr. 28, 1998

[54] DIGITAL PRINTER USING TWO-DIMENSIONAL, FULL FRAME LIGHT VALVE

[75] Inventors: Anthony M. Federico; William L. Valentine, both of Webster, N.Y.; William D. Turner, San Marino, Calif.

[73] Assignee: Xerox Corporation, Stamford, Conn.

[21] Appl. No.: 234,896

[22] Filed: Apr. 28, 1994

[51] Int. Cl.$^6$ ............... B41J 2/47; G01D 15/14; G02F 1/11; G03B 27/72
[52] U.S. Cl. .............. 347/256; 345/102; 347/255
[58] Field of Search ................. 346/108, 160, 346/107 R, 107.5; 359/245, 315, 320, 322, 201, 202; 347/239, 238, 255, 256; 345/102, 4, 5; 399/5

[56] References Cited

U.S. PATENT DOCUMENTS

| | | | |
|---|---|---|---|
| 3,985,438 | 10/1976 | Kurita | 355/66 |
| 4,477,175 | 10/1984 | Snelling | 399/5 |
| 4,797,694 | 1/1989 | Agostinelli et al. | 347/239 |
| 5,028,939 | 7/1991 | Hornbeck et al. | 347/131 |
| 5,128,773 | 7/1992 | Sato | 347/132 |
| 5,184,117 | 2/1993 | Gauthier | 345/102 |
| 5,192,969 | 3/1993 | Igarashi et al. | 355/22 |
| 5,198,920 | 3/1993 | Gobeli et al. | 359/245 |
| 5,428,366 | 6/1995 | Eichenlaub | 345/102 |
| 5,495,581 | 2/1996 | Tsai | 395/347 |

FOREIGN PATENT DOCUMENTS 4097331  3/1992  Japan .

OTHER PUBLICATIONS

Wu, I-W., Lewis, A.L., Huang, T-Y., Chiang, A., "Performance of Polysilicon TFT Digita Circuits Fabricated with Various Processing Techniques and Device Architectures," *SID 90 Digest*, 1990, pp. 307-310.

European Search Report from corresponding Application No. 95302794.3

Hammond, Thomas J. "Color Printer Modification for Flash Based Copier" Xerox Disclosure Journal, vol. 16, No. 5, XP 000228148, Sep./Oct. 1991, Stamford, Conn., US, p. 305.

*Primary Examiner*—Benjamin R. Fuller
*Assistant Examiner*—Raquel Yvette Gordon
*Attorney, Agent, or Firm*—Stuart P. Kaler; Tracy L. Hurt

[57] ABSTRACT

A digital printer for printing images in response to full-frame, two-dimensional digital image data input from an outside source. The digital printer is a novel combination of a two dimensional backlight for producing full frame illumination in a single flash, a photoreceptor sensitive to light emanating from the backlight, a two-dimensional, transmissive light valve, an imaging system, and a driver. The light valve is disposed between the backlight and the photoreceptor so that light from the backlight is transmitted through the light valve, producing a full-frame, two dimensional image on the photoreceptor in response to a single flash of the backlight. The full-frame, two dimensional image corresponds to a pattern formed on the light valve in response to the full-frame, two dimensional digital image data. The imaging system is disposed between the light valve and the photoreceptor, such that it focuses the full-frame, two dimensional image onto the photoreceptor. The driver is coupled to the light valve, the backlight and the outside source. The driver couples the full-frame, two dimensional digital image data from the outside source to the light valve. The driver also synchronizes the backlight with the light valve such that the backlight flash exposes the light valve after the pattern is set on the light valve in response to the full-frame, two dimensional digital image data.

7 Claims, 16 Drawing Sheets

DIGITAL PRINTER USING TWO-DIMENSIONAL, FULL FRAME LIGHT VALVE

FIELD OF THE INVENTION

The present invention relates in general to digital printers and, in particular, to digital printers that employ a two-dimensional, full frame light valve for flash exposure of the photoreceptor surface.

BACKGROUND OF THE INVENTION

The demand for digital printing has swelled with the advent of computing. The development of low-cost, high-speed computing has fundamentally impacted on the way users make documents. Wordprocessing and graphics programs have greatly eased the time and amount of effort required for document creation. All of these electronic documents are stored digitally in the computer until the user desires a hardcopy of the document.

Because the vast majority of created documents are stored in digital form, it was only natural to devise a method of printing hardcopy directly from digital data. One current means of digital printing is laser xerographic printing. Digital data is supplied to the laser printer which is used to modulate the laser beam. The beam is raster scanned onto a photoreceptor surface in a line-by-line fashion. As the laser beam sweeps across the surface in the "scan direction", the photoreceptor moves in a perpendicular direction (the "process direction").

Although laser printing has been largely successful in the marketplace, the technique of raster scanning has some inherent limitations. One such limitation is speed. The top speed of a raster scanning printer is bounded by the maximum speed that a laser beam may be swept across the surface of a photoreceptor. A number of factors contribute to that upper bound, one such factor includes the top rotational speed of the mirror-faceted polygon which deflects the beam to produce the scan sweep. Currently, polygons driven by ball-bearing motors have top speeds of approximately 25,000 RPM. Polygons having air bearings have higher rotational rates yet; but their cost is also much higher than the ball-bearing version. As a result of this limitation, the current top throughput of a single beam laser printer is approximately 200 pages per minute.

Another limitation of laser printing is the need for precision. Laser printing must be accomplished with exacting mechanical precision. Perfect synchronization between the photoreceptor and the raster scanned beam must be kept throughout the entire image writing process. The slightest deviation becomes noticeable to the human eye which is highly sensitive for spotting defects (e.g. deviations in "parallelness") in line after line of written text, or in graphic images and pictorials.

These deviations occur chiefly due to imperfect control of the relative motion between the photoreceptor and the raster scanned beam. Relative motion control problems manifest themselves over the course of printing a page, which typically occurs in as little as one half of a second and with a relative displacement of up to 17 inches.

Another method of digital printing that eliminates relative motion control problems has been described in: "Hybrid ER Copier", "Printer Modification for Flash Based Copier", "Color Printer Modification for Flash Based Copier", and "Fax Modification for Flash Based Copier", all by Thomas Hammond, published in Xerox Disclosure Journal (XDJ) Vol 16, No. 5, September/October 1991, at pages 309, 311, 305 and 307 respectively. Hammond's basic digital printer, as described in "Printer Modification for Flash Based Copier", uses a reflective (i.e. no backlighting), full frame, liquid crystal display (LCD) as a front end image projector for a flash based copier. Hammond proposes positioning the LCD over the platen of the copier in such a manner as to allow the LCD to provide the input image into the copier.

To print digital data, Hammond first loads digital data into the LCD. Once the full LCD page is displayed, the copier would flash expose the LCD, thus exposing the copier's photoreceptor with the image data displayed on the LCD. In effect, the photoreceptor would be exposed with the same image data as if the original document were on the platen as opposed to the LCD. FIG. 1 shows how the LCD would be configured atop the copier to produce the digital printer.

As compared with laser printing, Hammond's digital printing method has no relative motion control problems. As will be discussed below, if the flash exposure is of sufficiently short duration, then there is no such problem.

Hammond's method of digital printing allows for the decoupling of the functions of printing and copying. Hammond describes that, by removing the LCD from atop the platen, the copier may function as it usually does—as a stand alone copier. However, merely combining an LCD and a separate copier together to produce a printer is not effective from both a design and user point of view for several reasons.

First, to achieve this effective decoupling, Hammond uses a reflective LCD (as opposed to a transmissive LCD) to provide image data input. The copier then flash exposes the LCD whenever the user commands. To copy another full frame image, the user would wait for the next image to be set in the LCD before the copier is allowed to flash expose. Thus, without a tighter coupling of the LCD to the copier, printer throughput suffers.

Second, a separate, detachable LCD would need to be properly registered every time it was reattached to the copier. This reattachment and registration requires that the user invest additional time in the proper usage of Hammond's digital printer.

Thus, there exists a need for a digital printer that tightly couples the function of the image generator with its printer engine. Additionally, there is a need for a digital printer that can synchronize the functions of the image generator with the printer engine at electronic speeds to increase printer throughput.

It is thus an object of the present invention to provide a digital printer that couples and synchronizes the functions of image generating with printing.

SUMMARY OF THE INVENTION

In summary, the present invention is a digital printer for printing images in response to full-frame, two-dimensional digital image data input from an outside source. The digital printer is a novel combination of a two dimensional backlight for producing full frame illumination in a single flash, a photoreceptor sensitive to light emanating from the backlight, a two-dimensional, transmissive light valve, an imaging system, and a driver. The light valve is disposed between the backlight and the photoreceptor so that light from the backlight is transmitted through the light valve, producing a full-frame, two dimensional image on the photoreceptor in response to a single flash of the backlight. The full-frame, two dimensional image corresponds to a pattern formed on the light valve in response to the full-frame, two dimensional digital image data. The imaging system is disposed between the light valve and the photoreceptor, such that it focuses the full-frame, two dimensional image onto the photoreceptor. The driver is coupled to the light valve, the backlight and the outside source. The driver couples the full-frame, two dimensional digital image data from the outside source to the light valve. The driver also synchronizes the backlight with the light valve such that the backlight flash exposes the light valve after the pattern is set on the light valve in response to the full-frame, two dimensional digital image data.

In another aspect of the present invention, very compact lenslet arrays are employed in lieu of traditional optics. This reduces the overall space requirements of the presently claimed digital printer—making it readily suitable for desk-top application.

One advantage of the present invention is speed. Because the light valve is set according to electrical signals representing the digital image data, loading the light valve involves only a very short period of time. Similarly, flash exposing the image onto the photoreceptor involves a second, very short time period. Thus, the time for capturing a latent image from digital data with the present invention compares favorably with time required to capture a full-page latent image with a raster scanning printer. Likewise, the coupling of the LCD to the flash exposure allows for synchronous activity between the LCD and the backlight at electronic speeds. Thus, higher page throughput may be achieved than user-demand printing system that are not similarly synchronized.

Another advantage of the present invention is absence of relative motion effects. The entire, full-page image is transferred in such a small time period to the belt so there is no problem with mechanical imprecision, such as found in a raster scanner that must maintain precision line-after-line.

Additional objects and features of the present invention will be more readily apparent from the following detailed description of an exemplary embodiment thereof, as illustrated in the accompanying drawings.

BRIEF DESCRIPTION OF THE DRAWINGS

The purpose and advantages of the present invention will be apparent to those skilled in the art from the following detailed description in conjunction with the drawings.

DETAILED DESCRIPTION OF THE PREFERRED EMBODIMENTS

The following description is presented to enable any person skilled in the art to make and use the invention, and is provided in the context of a particular application and its requirements. Various modifications to the preferred embodiment will be readily apparent to those skilled in the art, and the generic principles defined herein may be applied to other embodiments and applications without departing from the spirit and scope of the present invention as defined by the appended claims. Thus, the present invention is not intended to be limited to the embodiment shown, but is to be accorded the widest scope consistent with the principles and features disclosed herein.

1. Digital Printer

Figure 1:
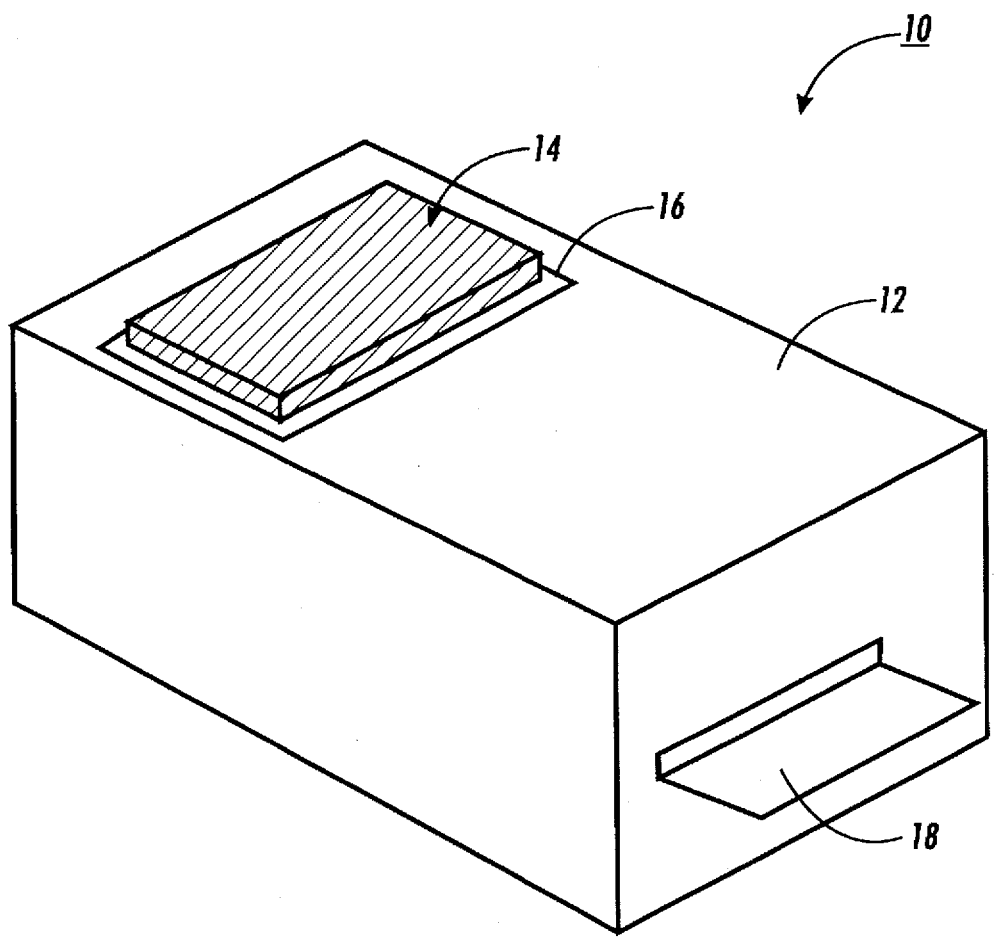
FIG. 1 is a perspective view of the digital printer as described in the aforementioned XDJ article by Hammond.

Referring to FIG. 1, a perspective view is shown of the digital printer 10 as described in the XDJ article by Hammond. Hammond describes a digital printer which comprises a stand-alone, reflective LCD 14 and a stand-alone, flash expose copier 12. To construct Hammond's digital printer, the LCD 14 is placed atop the platen 16 of the copier 12 such that the image created by flash exposing the reflective LCD is focused onto the surface of the photoreceptor (not shown). The copier produces hard copy (e.g. paper) output 18 from image displayed on the reflective LCD.

Because Hammond allows for decoupling the print and copy functions of this configuration, the reflective LCD may be removed and reattached from the copier. Thus, it is important to properly re-register the LCD every time the LCD is reattached. Otherwise, print defects will show in the final hard copy (e.g. noticeable black borders, print lines not parallel with edges of the paper, etc.).

Another drawback arises because of this decoupling—namely, asynchronous functioning of the LCD and the copier. Because the LCD is autonomous from the copier, the LCD must be set before the copier may flash expose the LCD (presumably in response to user demand). Without synchronous functioning, the throughput of the digital copier combination as described in Hammond may not be as fast as one that has a fully coupled and integrated digital LCD display with the copier.

Another drawback not addressed by Hammond is space design. Hammond proposes using any commercially available flash exposure copier in combination with a reflective LCD by merely setting the LCD atop the platen of the copier. This does not necessarily lead to the optimal design from the standpoint of space requirements. The ordinary optics found in current copiers may require as much as three feet to accommodate the optical path. By using high performance lenslet arrays, as described below, the present invention may use as little as three inches for the optical path. This allows the present invention to be small enough to practically sit on a desktop.

Figure 2:
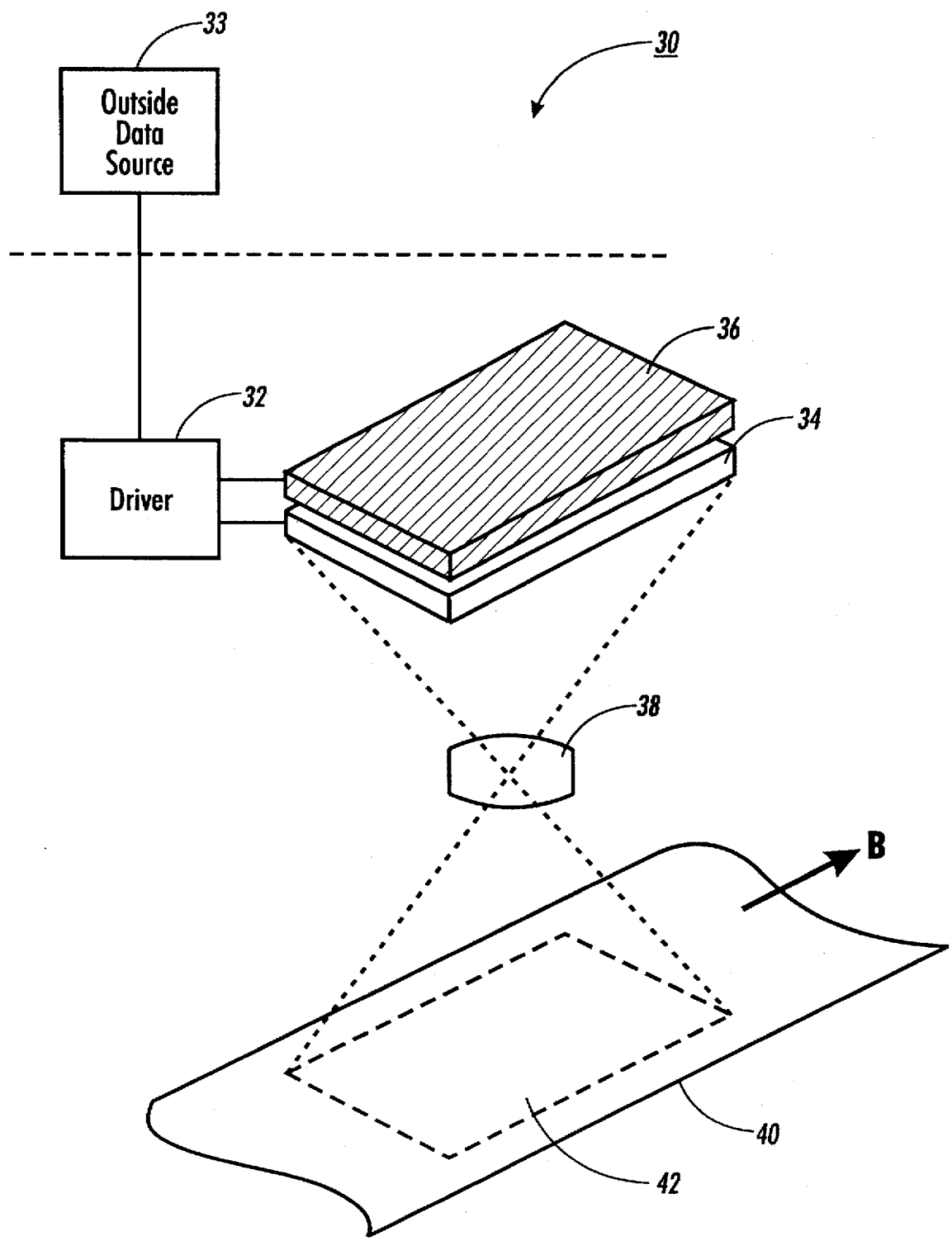
FIG. 2 is a perspective view of the components comprising the present invention.

FIG. 2 is a perspective view of the components comprising the present invention. The presently claimed digital printer 30 comprises a transmissive LCD light valve 34, a uniform, full frame backlight 36, a driver 32, an imaging system 38, and a photoreceptor belt 42.

As shown, driver 32 is coupled to both backlight 36 and light valve 34. The driver is the unit that synchronizes the actions of the light valve 34, backlight 36 and any outside sources 33 of digital data. Driver 32 accepts digital image data from an outside source 33 such as a storage area (not shown), another computer (likewise not shown) or the like. Driver 32 then sends the digital data to light valve 34 which in turn forms a pattern according to the data. After the light valve 34 is set, driver 32 signals backlight 36 to illuminate the light valve. The light from the backlight 36 is a brief, intense illumination; thus, "flash" exposing the photoreceptor 40, whose belt is moving in the direction of arrow B. The image exposed on the photoreceptor is depicted as the image 42. It will be appreciated that the design of a suitable driver to accomplish the above functions is well known to those skilled in the art.

It will also be appreciated that while the present invention contemplates the use of any light valve and backlighting, it is desirable to use light valves or displays of the highest resolution possible. One such suitable light valve is the 13 inch diagonal, 6.3 million pixel light valve developed by the Xerox Corporation. A description of this light valve may be found in U.S. Patent Application, application Ser. No. 08/235,011 entitled "Thin-Film Structure with Dense Array of Binary Control Units for Presenting Images" (hereinafter the "Array" application), filed concurrently herewith and described below in Section II.

Likewise, it will be appreciated that the backlight 36 and light valve 34 may operate through separate drivers. The only requirement is that the drivers for the backlight and the light valve should be suitably synchronized such that the illumination of the light valve occurs after the setting of the light valve.

Figure 3A:
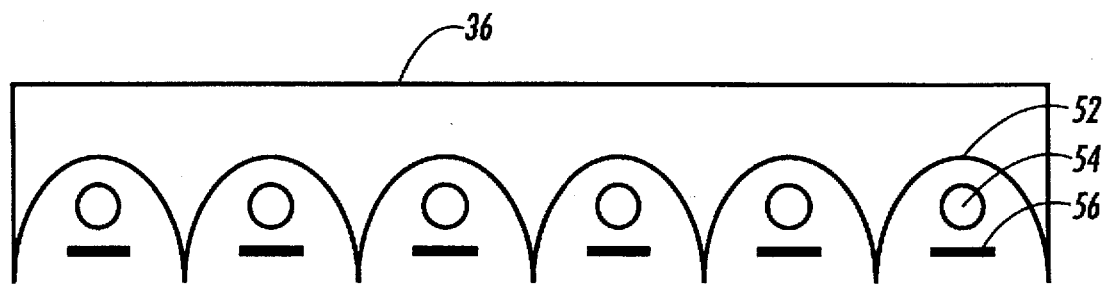
FIGS. 3A-3B are cross sectional views of two separate embodiments of the backlight used in the present invention.
Figure 3B:
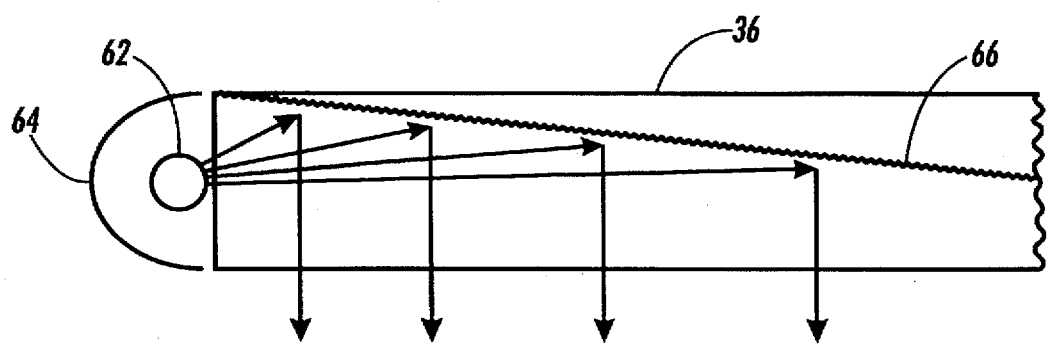

FIGS. 3A and 3B depict two separate embodiments of the backlight suitable for the purposes of the present invention. The only requirement common to any potential backlight is that it provide uniform lighting with sufficient illumination to expose the photoreceptor. FIG. 3A shows, in cross section, the first embodiment of backlight 36. Backlight 36 consists of a number of lighting elements 54, each disposed within a cavity defined by reflector 52. In order to avoid a "hot spot" (i.e. a place where the light intensity is on average greater than other spots), filter 56 may be disposed directly between the lighting element 54 and the opening of the cavity. The filter 56 may itself be either a diffuser, an absorber, or a reflector (either partial or total). For any given particular application, the particular composition of the filter may be set in order to avoid the creation of a hot spot directly underneath the lighting element 54.

FIG. 3B is a cross sectional view of another backlight embodiment. Backlight 36 in FIG. 3B is an edge-lit backlight that uses a solid, transparent dielectric light guide 66 that confines the light rays (emanating from lighting element 62 and reflected by reflector 64) by internal reflection. Light may be reflected by the guide 66 by a variety of mechanisms, such as narrowing the guide (which causes the light rays to diverge and escape), the controlled roughing of the surface of the guide as a function of distance from the edge light, or the incorporation of a prismatic structure in the surface. Generally, anything that disturbs the longitudinal symmetry of the structure will cause light to escape. FIG. 3B depicts the narrowing of the guide and controlled roughing of the guide surface to cause uniform reflection.

These and other techniques for edge-lit backlighting are well known in the art and are further discussed in the following articles which are hereby incorporated by reference: "23.1: Invited Address: Light Distribution Methods for Backlighting LCDs" by Whitehead et al, in SID 92 Digest at page 419; and "5.4: Bright and Thin LCD Backlights for Monochrome and Color LCDs", by Lu et al, in SID 93 Digest at page 33. It will be appreciated that for the purposes of the present invention, any backlight method that provides the necessary uniformity and sufficient intensity is suitable. Thus, the present invention should not be limited to the embodiment herein disclosed.

The sufficiency of the light intensity may be calculated by knowing the sensitivity of the photoreceptor surface. Typically, the illumination required at the photoreceptor is 5–10 ergs/cm$^2$. If the light valve is calculated at 30 per cent efficiency and the imaging system is 0.5 per cent efficient, then the exposure at the input to the light valve must be $0.667 \times 10^{-4}$ joules/cm$^2$. For an 11×8.5 inch exposure, 0.4 joules is required. For a flashlamp that has a coupling efficiency into the light valve of 1 per cent, the flashlamp should be about 40 joules, which is feasible in current technology.

After the illumination of the digital pattern formed on the light valve, the resulting image passes through an imaging system 38 for focusing the image onto the surface of the photoreceptor 40. The exposed image is depicted in FIG. 2 as image 42. It will be appreciated that the design and construction of a suitable imaging system (comprising a combination of lenses, mirrors, apertures, and the like) is well known to those skilled in the art.

The imaging system focuses the image 42 onto the surface of the photoreceptor 40. In order to achieve high throughput, photoreceptor 40 may comprise a moving belt that is sufficiently long to hold multiple latent images and is processed by several stations (e.g. charging, imaging, toning, fusing, cleaning, and the like) simultaneously. The movement of the belt is indicated in FIG. 2 by arrow B.

As mentioned previously, the flash exposure of a full-page, two-dimensional image onto a photoreceptor is faster and eliminates the relative motion problem that arises with the use of raster scanning. The present invention, however, must account for one design consideration—blur. Blurring of the latent image occurs because the photoreceptor belt is moving. Since the time of the "flash" is non-zero, the belt 40 will have moved relative to image 42 over the course of the exposure; thus causing blur.

It is generally accepted that one pixel width of blur is within adequate tolerances for human readability. To design the present invention within one pixel width of blur, the flash exposure time and the speed of the photoreceptor belt is adjusted accordingly. For example, supposing that a pixel has the width of $1.6 \times 10^{-3}$ inches, it can be shown then that for a flash exposure time of 60 µsecs allows for a photoreceptor belt speed of 160 pages per minute (assuming that 10 inches are needed to define the length of a given page image on the belt). Likewise, it can be shown that a flash exposure time of 30 µsecs allows for printing speeds of 320 pages per minute.

The flash exposure time is a function of the frame rate of the light valve. The faster the light valve can be patterned and exposed, the faster the belt can be moved to stay within the one pixel of blur tolerance. It will be appreciated that these sample throughput rates are much higher than the current throughput for raster scanning printers.

Figure 4:
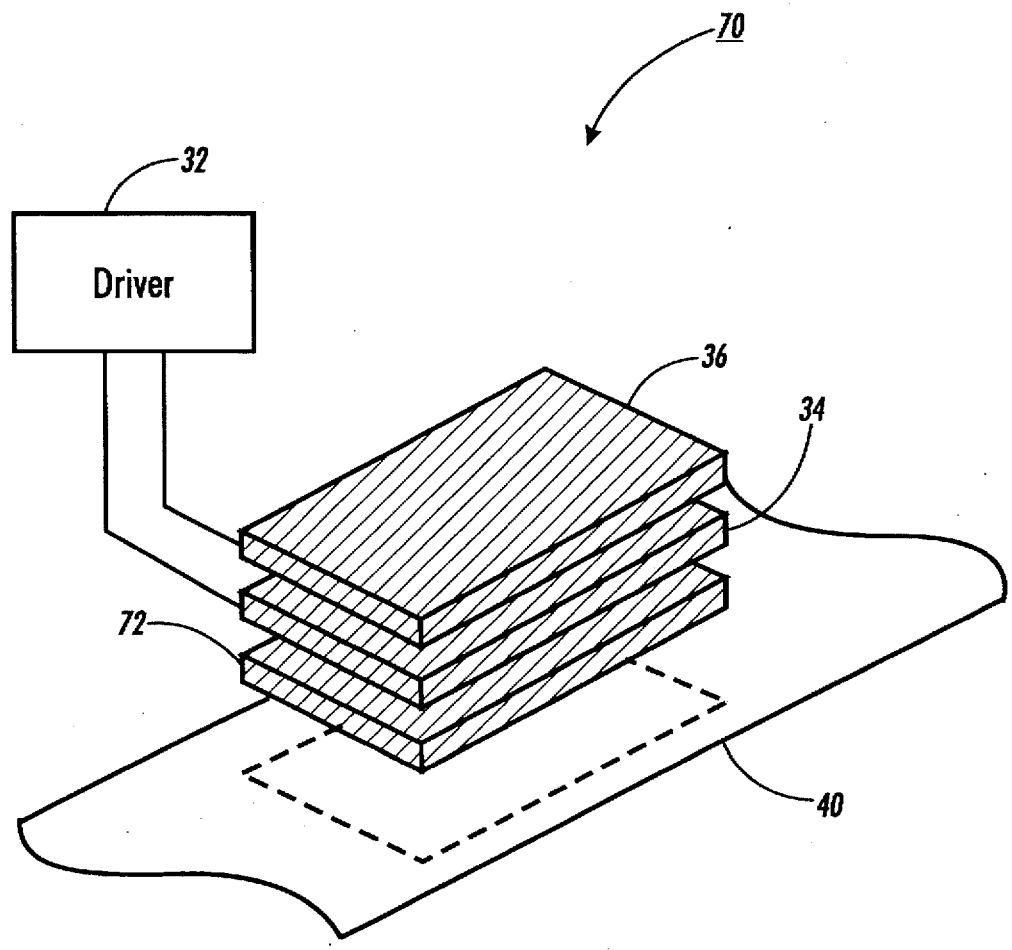
FIG. 4 is an alternative embodiment of the present invention employing an alternative imaging system provided by a lenslet array.

FIG. 4 is an alternative embodiment 70 of the present invention. An alternative imaging means is provided by a lenslet array 72. The advantage of using a lenslet array instead of a conventional imaging means is reduced space requirements. While the optical path required for the more conventional design of FIG. 2 might take up 3 feet, the present invention as embodied in FIG. 3 may require only 3 inches—a significant reduction in design space. It will be appreciated that lenslet arrays are well known to those skilled in the art and are commercially available.

Figure 5:
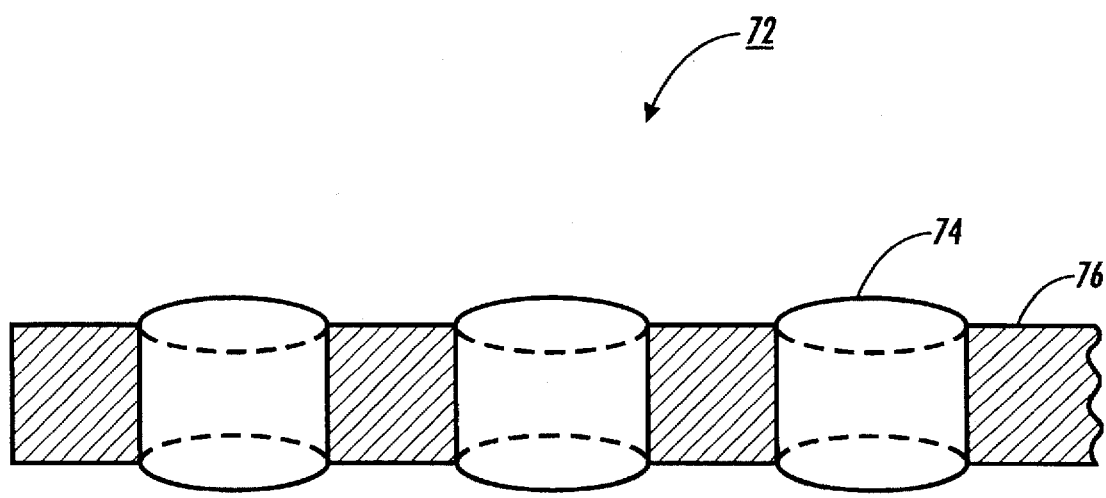
FIG. 5 is cross sectional view of a commercially available embodiment of lenslet array suitable for use in the present invention.

FIG. 5 is a cross sectional view of a commercial available embodiment of the lenslet array, as depicted as array 72 in FIG. 4. FIG. 5 shows the cross section of a lenslet array 72 as commercially produced by Corning under the trademark SMILE. Lenslet array 72 is fabricated by subjecting a light-sensitive glass material to a photothermal process. The glass is exposed to ultraviolet light through a photomask which is then thermally treated, causing the area exposed to UV light to undergo crystallization and densification.

During crystallization, the exposed glass physically contracts in three dimensions, forcing the unexposed glass to erupt into spherical shaped lenses 74. In addition to forming the lenses, the thermal process renders the area 76 surrounding the lenses optically opaque. This particular embodiment is described in the article entitled "Photothermal Technique Generates Lens Arrays", by Baranowski et al, published in the November 1989 edition of Laser World Focus magazine. A similarly suitable embodiment is also commercially available through Nippon Sheet Glass under the trademark SEL-FOC.

In summary, the present invention is a digital printer comprising the novel combination of a two-dimensional, transmissive light valve, a two-dimensional backlight to flash expose a photoreceptor, a driver to synchronize the functions of the light valve and the backlight, an imaging system, and a photoreceptor. In another aspect of the present invention, the imaging system could comprise a compact lenslet array in lieu of a more traditional optical system. Use of the lenslet array reduces the overall space requirement for the design of the presently claimed digital printer.

Because the activities of the light valve and the backlight are synchronized at electronic speeds, the printer throughput is much higher than a digital printer that decouple the functions of LCD light valve and copying. Additionally, the registration of the light valve is constantly set in the present invention as opposed to any digital printer combination that has a separate stand-alone LCD display and a separate stand-alone copier.

II. Thin Film Structure with Dense Array of Binary Control Units for Presenting Images A. General Features FIG. 6 shows an array of binary control units, illustrating general features of the invention.

Figure 6:
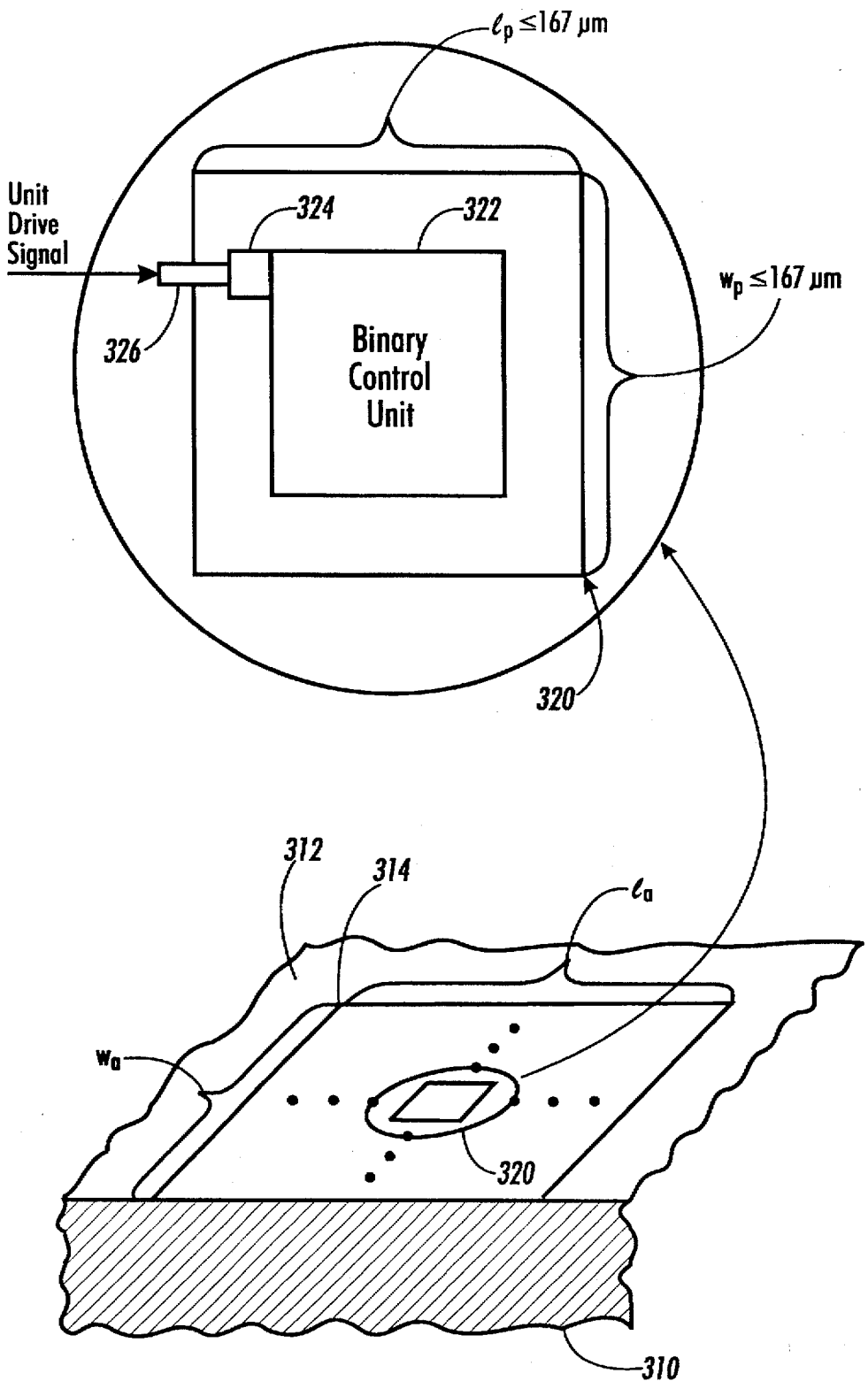
FIG. 6 is a schematic diagram showing an array of binary control units with an array large enough for direct viewing, with binary control unit densities of at least 60/cm, and with each binary control unit responding to a unit drive signal by presenting a segment with either a maximum or minimum intensity.

Insulating substrate 310 in FIG. 6 has a surface at which thin-film structure 312 is formed. Thin-film structure 312 includes array 314 of binary control units for presenting images. As shown, array 314 has width $w_a$ and length $l_a$, with an area ($w_a \times l_a$) large enough that array 314 can present images for direct viewing.

Area 320 of array 314 is a square that includes one of the binary control units and that has a side length equal to the effective widths of the binary control units in array 314. Area 320 is illustratively shown in an expanded view. Binary control unit 322 has lead 324 connected to line 326 for receiving a unit drive signal.

Binary control unit 322 responds to the unit drive signal received by lead 324 by causing presentation of a segment with either of two colors, one color having the maximum intensity binary control unit 322 can provide, the other color having the minimum intensity binary control unit 322 can provide. When the unit drive signal received by lead 324 changes, binary control unit 322 responds by changing from one of the colors to the other. The binary control units in array 314 can present images by responding in this manner to their unit drive signals.

Area 320, the area that includes binary control unit 322, has width $w_p$ and length $l_p$, each of which is no greater than 167 µm. Therefore, the densities of binary control units in array 314 in both the width and length directions are approximately 60/cm or more.

B. Implementation

The general features described above could be implemented in numerous ways to provide a display with a dense array of binary control units that has an area large enough to present images for direct viewing. As described below, the general features have been implemented to provide both monochrome and color displays. The implementations described below are also described in Martin, R., Chuang, T., Steemers, H., Allen, R., Fulks, R., Stuber, S., Lee, D., Young, M., Ho, J., Nguyen, M., Meuli, W., Fiske, T., Bruce, R., Thompson, M., Tilton, M., and Silverstein, L. D., "P-70: A 6.3-Mpixel AMLCD," SID 93 Digest, 1993, pp. 704–707.

B.1. Binary Control Unit

Figure 7:
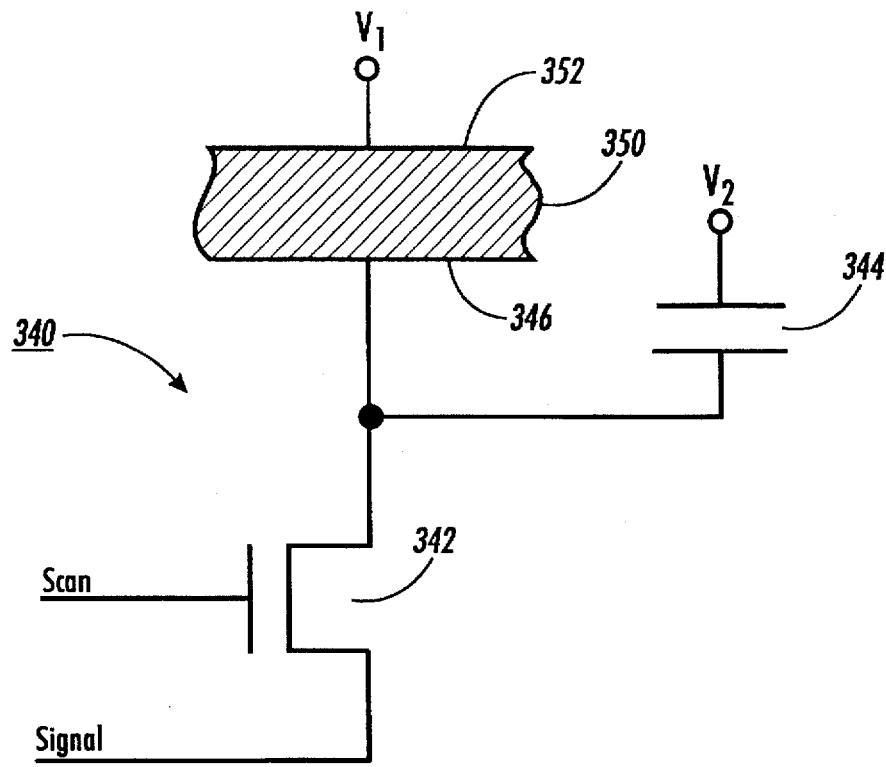
FIG. 7 is a schematic circuit diagram showing electrical components of a conventional binary control unit.
Figure 8:
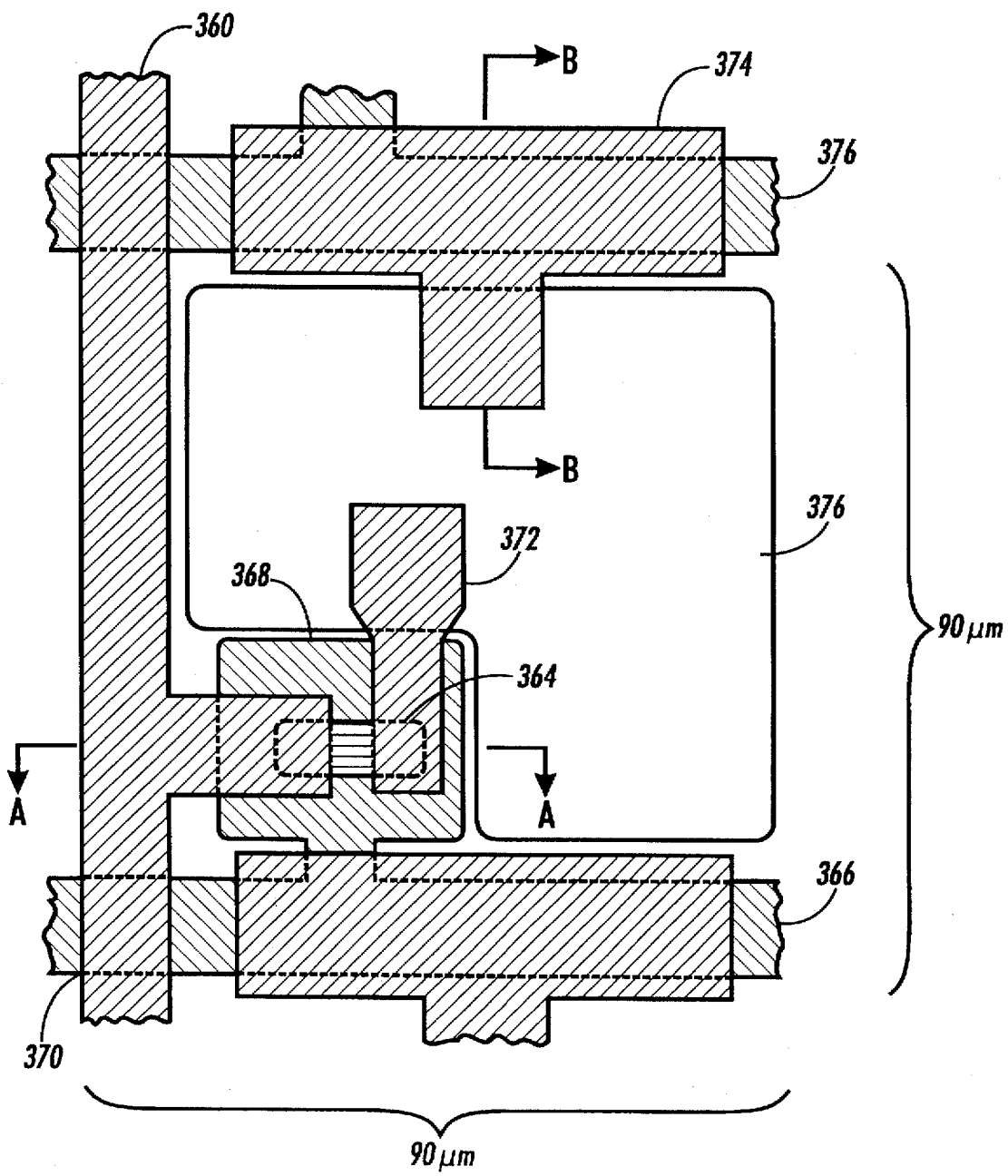
FIG. 8 is a schematic layout diagram showing features of a layout implementing the electrical components of FIG. 7.

FIG. 7 shows the electrical structure of a conventional binary control unit. FIG. 8 shows a layout of a binary control unit implementing the structure of FIG. 7.

As shown in FIG. 7, binary control unit 340 includes 342, storage capacitor 344, and electrode 346 which, with liquid crystal material 350 and opposite electrode 352, defines a part of a liquid crystal cell in which binary control unit 340 controls light transmission. As shown, the gate lead of transistor 342 is a scan lead or electrode and one of the channel leads of transistor 342 is a signal lead or electrode. The other channel lead of transistor 342 is connected to electrode 346, while opposite electrode 352 is at voltage V1. Similarly, the other channel lead of transistor 342 is connected to a charging lead of capacitor 344, with the other lead of capacitor 344 at voltage V2. Features in FIG. 7 are described in more detail in Kaneko, E., Liquid Crystal TV Displays: Principles and Applications of Liquid Crystal Displays, Tokyo, KTK Scientific, 1987, p. 212–277.

FIG. 8 shows part of a layout that implements the electrical structure of FIG. 7 for each of a dense array of binary control units. The layout in FIG. 8 implements transistor 342 in FIG. 7 with a non-self-aligned inverted staggered thin-film transistor (TFT). The channel of the TFT is approximately 5 μm wide and 16 μm long, and the gate lead extends beyond the channel between 5-8 μm.

Several layers are shown in FIG. 8, with upper layers that are farthest from the substrate's surface obscuring lower layers. The uppermost layer shown in FIG. 8 is a top metal layer, which forms data line 360 connected to a channel lead of transistor 342; the top metal layer also forms several other features described below. The next layer shown is a layer of indium-tin-oxide (ITO), which forms transparent electrode 362, serving as electrode 346 in FIG. 7. The next layer is a top nitride layer, which forms island 364, part of transistor 342; the top nitride layer can form other features as mentioned below. The lowest layer shown is a bottom metal layer, which forms gate line 366 and, connected to it, gate lead 368, which serves as the gate lead of transistor 342.

Data line 360 can be implemented with a resistance of 0.2 ohm/sq. and can be driven at −8 V, 0 V, and +8 V. Data line 360 provides a data signal to a column of binary control units, one of which is shown in FIG. 8. The part of data line 360 that extends over gate lead 368 connects to the source lead of transistor 342.

Gate line 366 similarly provides a scan signal to a row of binary control units. Gate line 366 can be implemented with a resistance of 1.4 Ohm/Sq and can be driven at +15 V and −15 V.

Data line 360 and gate line 366 are each 10 μm wide. Data line 360 crosses over gate line 366 in crossover region 370. Crossover region 370 can include an insulator formed by the top nitride layer, and other features as necessary to ensure that the two lines conduct signals adequately and that signals in the two lines do not interfere.

Transparent electrode 362 connects to the drain lead of transistor 342 through drain line 372, formed by the top metal layer. Therefore, when transistor 342 is conductive due to a scan signal provided to gate lead 368 by gate line 366, transparent electrode 362 receives and stores a drive signal from data line 360 through drain line 372.

Transparent electrode 362 also connects to charging lead 374, which implements one electrode of storage capacitor 344 in FIG. 7 and is formed by the top metal layer. Gate line 376, formed by the bottom metal layer, implements the other electrode of storage capacitor 344; gate line 376 also provides a scan signal to the preceding binary control unit in the same column. The ratio of the capacitance of capacitor 344 to the maximum liquid crystal capacitance is approximately 1.4, with each capacitance being a few tenths of a picofarad.

The binary control unit shown in FIG. 8 is square, and an array of identical binary control units would have effective widths in the row and column directions of 90 μm×90 μm. As a result, densities of approximately 111/cm can be achieved.

B.2. Array

Figure 9:
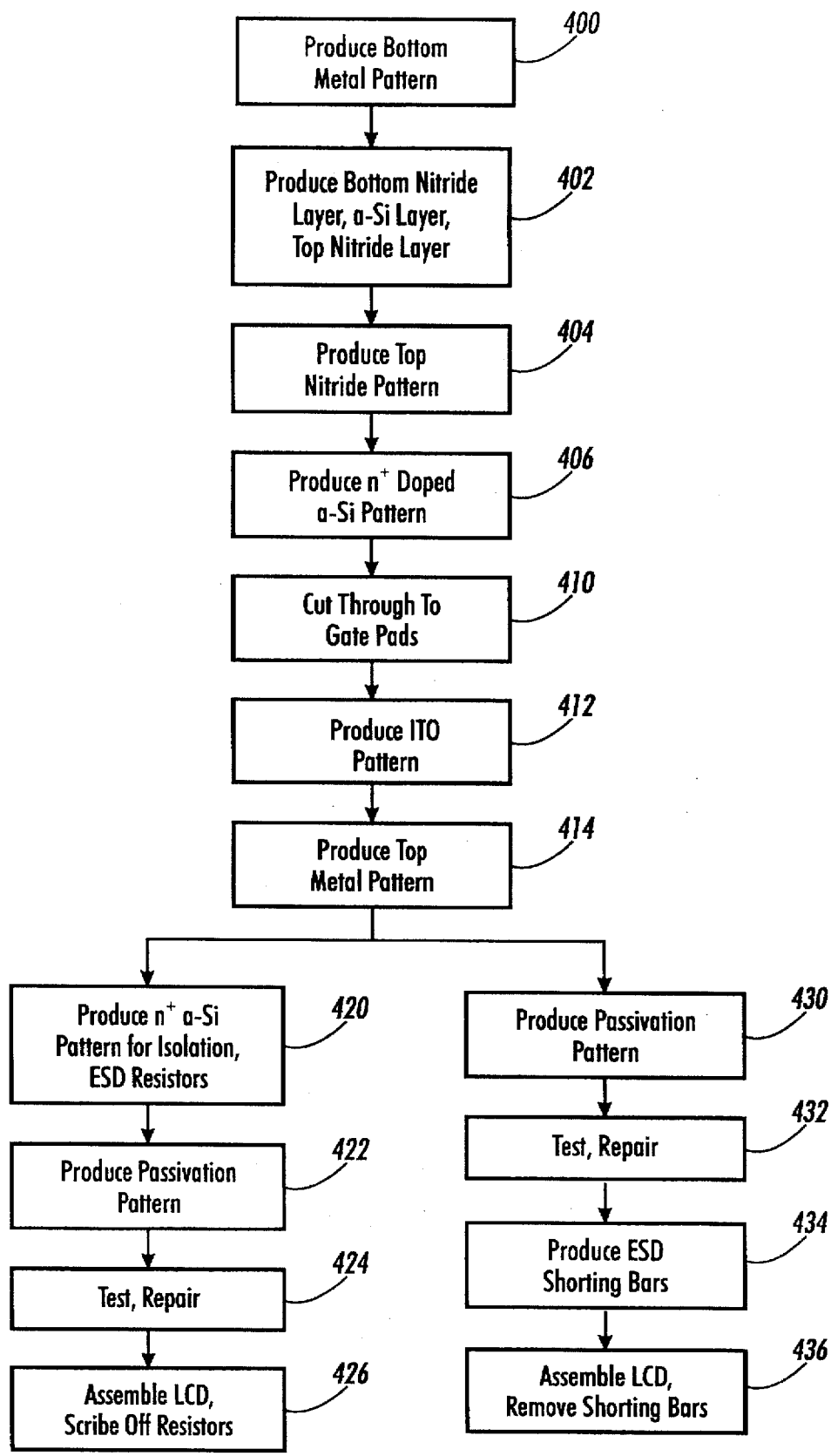
FIG. 9 is a flow chart showing acts in a process that can implement the layout of FIG. 8.
Figure 10:
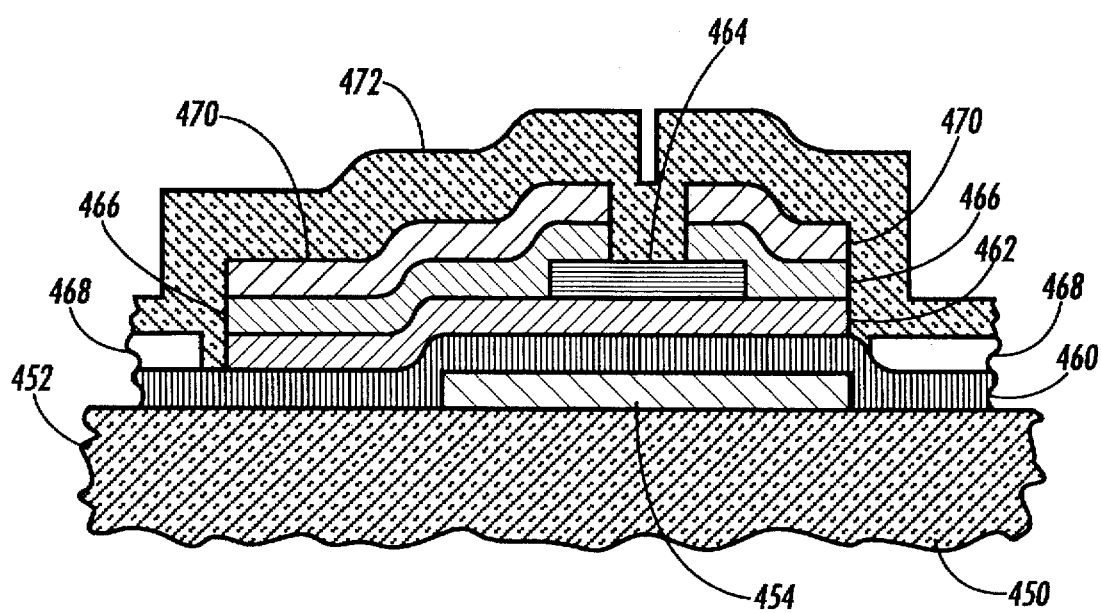
FIG. 10 is a cross-sectional view along the line A—A in FIG. 8 of a thin-film structure produced by the acts in FIG. 9.
Figure 11:
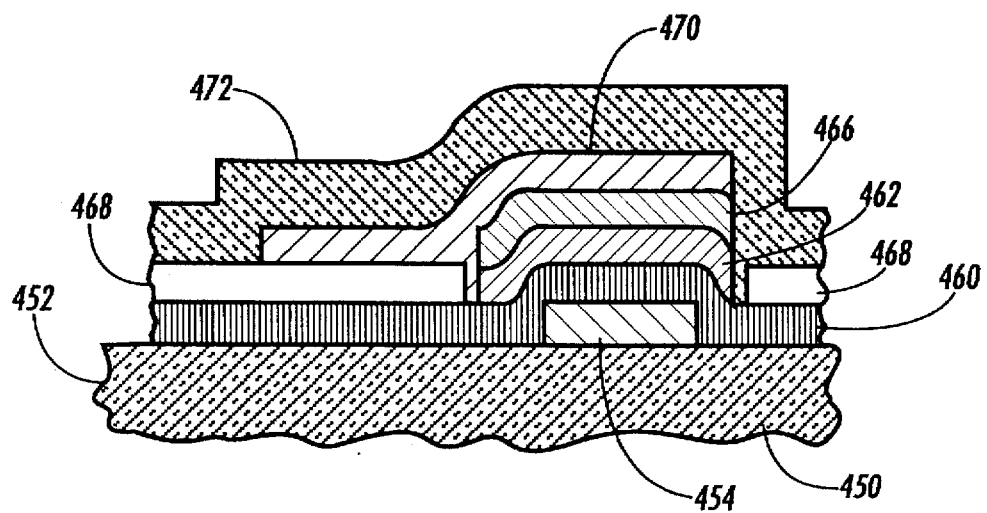
FIG. 11 is a cross-sectional view along the line B—B in FIG. 8 of a thin-film structure produced by the acts in FIG. 9.
Figure 12:
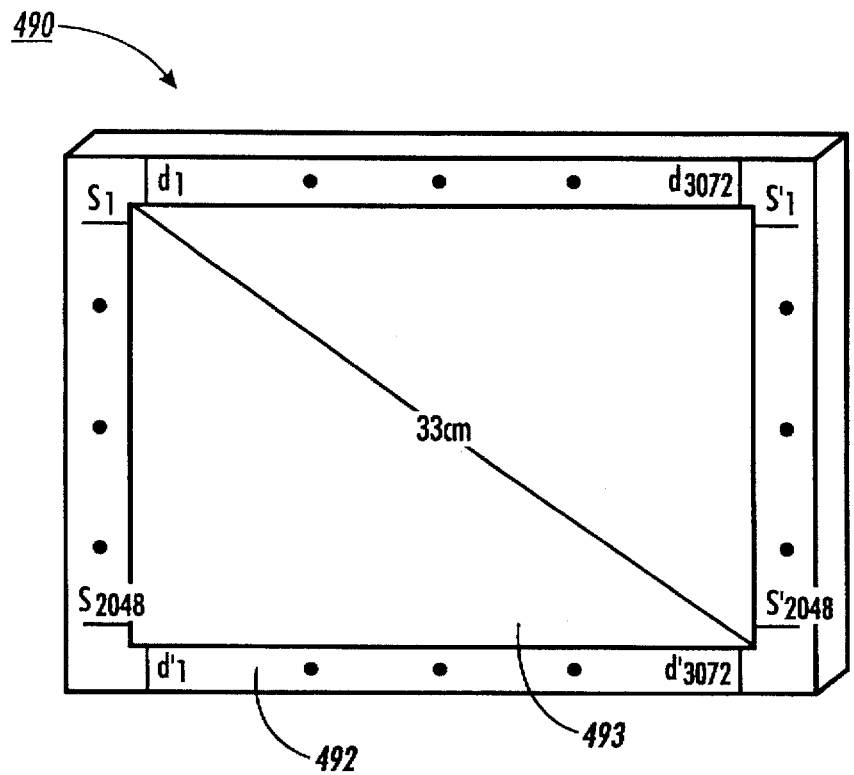
FIG. 12 is a perspective view of a product produced with the process of FIG. 9.

FIG. 9 shows acts in a process that can be used to produce an array with binary control units implementing the features of FIG. 8. FIG. 10 shows a cross-section along line A—A in FIG. 8 for a structure produced as in FIG. 9. FIG. 11 shows a cross-section along line B—B. FIG. 12 shows a product produced as in FIG. 9.

In FIG. 9, the act in box 400 begins by producing a bottom metal pattern that forms gate line 366 and gate lead 368 for each row of binary control units in an array and gate lead 368 for each binary control unit in each row. Each gate line 366 can have two pads, one at each end, for making connections to components off the substrate. The act in box 400 can be implemented by depositing metal using a physical vapor deposition process such as sputtering. The exposed photoresist can then be developed away to form a pattern of mask material over parts of the metal that are shaped like the scan lines. An etch appropriate to the metal can then remove the underlying metal in exposed areas, leaving the desired bottom metal pattern, from which the unexposed photoresist can be removed to prepare for subsequent layers.

Various specific techniques could be used to implement the act in box 400. In one working implementation, the bottom metal layer is 1500 angstroms thick and includes molybdenum and chromium, as described in copending, coassigned U.S. patent application Ser. No. 08/235,008, entitled "Thin-Film Structure with Conductive Molybdenum-Chromium Line." The bottom metal layer could be etched to obtain tapered gate lines as described in copending, coassigned U.S. patent application Ser. No. 08/235,010, entitled "Thin-Film Structure With Tapered Feature." Various other techniques could be used to produce the bottom metal layer, including techniques that provide a shunt layer such as titanium/tungsten over aluminum and techniques that provide alternating layers of aluminum to prevent hillock formation.

The act in box 402 then produces a bottom nitride layer, an amorphous silicon layer, and a top nitride layer. The act in box 402 has been implemented with plasma chemical vaper deposition (CVD) using a trilayer deposition or etch stop process that deposited three layers in sequence without breaking vacuum. The bottom nitride layer can be silicon nitride deposited at 300°–380° C. to obtain a refractive index of 1.87–1.97 and a thickness of 3000 angstroms. The amorphous silicon layer can be deposited at 230°–300° C. with 5–12% hydrogen, with a thickness of 300–500 angstroms. The top nitride layer can be silicon nitride deposited at 200°–250° C. to obtain a refractive index of 1.97–2.07 and a thickness of 1000–1500 angstroms.

Because the amorphous silicon layer acts as an etch stop, subsequent etching can remove the top nitride layer without removing the amorphous silicon layer and the bottom nitride layer. The act in box 404 therefore forms a pattern of top nitride. In addition to island 364 as in FIG. 7, the top nitride pattern can include an insulating layer in crossover region 370 that is sufficiently thick that signals in data line 360 and gate line 366 do not interfere, as described in more detail in copending, coassigned U.S. patent application Ser. No. 08/234,885, entitled "Thin-Film Structure with Insulating and Smoothing Layers Between Crossing Metal Lines."

The act in box 404 can be implemented with a photoresist exposure process as described above in relation to box 400, using a wet etch with 10 parts water per part of HF for 2.5 minutes or until clear to obtain a non-self-aligned TFT with island 364 significantly smaller than the gate lead. In a working implementation, island is approximately 5 μm in width, approximately 16 μm in length, and its edge is between 5–8 μm from the edge of the gate lead, an arrangement that prevents light from the substrate side from causing leakage in the TFT's channel. Since the top nitride pattern includes only areas above gate line 366 and other gate lines, a backside exposure could also be used in combination with an appropriate mask to obtain a top nitride pattern that extends to the edge of the gate lead within the TFT. The backside exposure technique could be used to produce a self-aligned TFT, which could improve TFT performance by minimizing overlap of the top and bottom metal layers. In any event, the edge of the top nitride pattern should not be exactly aligned with edges of gate line 366, either in the TFT or in crossover 370. The act in box 404 can also include cleaning with a solution of 200 parts water per part of HF for 30–60 sec to prepare the array for deposition of another layer of amorphous silicon.

The act in box 406 then produces a pattern of n+ doped amorphous silicon, providing source and drain contacts. The act in box 406 can be implemented by first performing plasma CVD to deposit an n+ doped amorphous silicon layer at 200°–250° C. with 5–15% hydrogen to a thickness of 1000 angstroms. The amorphous silicon can be doped, for example, with 0.5–2% phosphorous. Then, a photoresist exposure process as described above in relation to box 400 can be used with a dry plasma etch using 10 parts CF4 per part of O2 to remove the n+ layer and the undoped amorphous silicon layer from the area in which transparent electrode 362 will be formed, leaving only the bottom nitride on the substrate. In crossover region 370 and in other areas under data line 360, the n+ layer remains to form a smoothing layer so that data line 360 can be continuously formed, as described in copending, coassigned U.S. patent application Ser. No. 08/234,885, entitled "Thin-Film Structure with Insulating and Smoothing Layers Between Crossing Conductive Lines."

The act in box 410 cuts through layers deposited on the gate pads during the acts in boxes 402 and 406. The act in box 410 can be implemented with a photoresist exposure process as described above in relation to box 400, using an plasma etchant with 10 parts CF4 per part of O2. The act in box 410 can also make additional cuts to the gate lines for greater certainty of making metal-to-metal contact during subsequent steps.

The act in box 412 then produces an ITO pattern to form transparent electrode 362. The act in box 412 can be implemented by reactively sputter depositing a layer of ITO in 0.5–1.5% O2 at room temperature to a thickness of 500–1000 angstroms. Then a photoresist exposure process as described above in relation to box 400 can be used with a wet etch of HCl to remove the ITO layer everywhere except transparent electrode 362. The mask used in this process can be the complement of the mask used in box 406, but with a slight bias so that the ITO layer is separated slightly from the n+ amorphous silicon layer. The remaining ITO layer can then be annealed at 200°–230° C. for an appropriate time period between one and three hours.

The act in box 414 produces a top metal pattern as shown in FIG. 8. The top metal layer can include a barrier layer and a conductive layer, with the barrier layer a metal that prevents diffusion of metal from the conductive layer into the n+ amorphous silicon layer. The barrier layer can include chromium or titanium-tungsten, deposited at a pressure that produces a low stress layer. The conductive layer can be aluminum, for example.

The act in box 414 can be implemented by sputter depositing, in sequence without breaking vacuum, 500 angstroms of titanium/tungsten, 3000–4000 angstroms of aluminum, and 500–1000 angstroms of titanium/tungsten. Another sequence would be 500 angstroms of chromium followed by 4000 angstroms of aluminum. The act in box 414 can also use a photoresist exposure process as described in relation to box 400 with a wet etch to remove the top metal layer except from data line 360, drain lead 372, charging lead 374, and the gate pads exposed in box 410. For the three layers of top metal, the etch can be done in three steps, first etching titanium/tungsten with $H_2O_2$, then etching aluminum with a standard aluminum etchant, and then again etching titanium/tungsten with $H_2O_2$. The top metal layer on the gate pads allows easier bonding.

The act in box 420 produces a pattern of the n+ layer remaining from box 406 in which the TFT leads are isolated and in which the n+ layer provides electrostatic damage (ESD) resistors between all adjacent gate and data pads at the perimeter of the array. The act in box 490 can be implemented with a photoresist exposure process as described in relation to box 470 with conventional dry plasma etching techniques with 10 parts CF4 per part of O2 to remove the n+ layer and the undoped amorphous silicon layer from the unmasked area. The mask need cover only the ESD resistors, since the top metal layer will prevent etching of n+ layer under it. The act in box 420 isolates data line 360, drain line 372, and charging lead 374, ensuring isolation of the three TFT leads from each other.

The act in box 422 provides a passivation pattern. The act in box 420 can be implemented by depositing a passivation layer of silicon oxy-nitride at 180°–210° C. with a refractive index of 1.7–1.8, to a thickness of 6000 angstroms. A working implementation used 190° C. The passivation layer can be deposited at 180°–210° C. with a refractive index of 1.7–1.8, to a thickness of 6000 angstroms. The act in box 422 can use a photoresist exposure process as described in relation to box 400 with a plasma etch of 10 parts CF4 to one part O2 to remove the passivation layer from the data and gate pads.

The act in box 424 can then test the completed array, detecting and repairing any defective binary control units, any opens in scan or data lines, and any shorts between lines. Because the array is very dense, a few binary control units that are always OFF are not visible. For the same reason, magnification and other appropriate measures are necessary to detect defective binary control units. Once a defective binary control unit is detected, it can be repaired using a conventional laser repair station, such as from Photo Dynamics Inc., San Jose, Calif. or XMR Corp, Orange, Calif. The repair process can, for example, eliminate the electrical connection between gate line 366 and gate lead 368. Similarly, an open can be repaired by depositing a conductive layer across it and a short can be repaired by cutting scan lines on either side of the short.

Finally, the act in box 426 can then assemble a liquid crystal display (LCD), scribing off the ESD resistors after the LCD is assembled. ESD structures such as resistors are necessary for an active matrix liquid crystal display (AMLCD) because, during assembly, a thin layer of polyimide, approximately 100 angstroms, is buffed or rubbed before gluing. As a result, when the liquid crystal fills the cavity through capillary action, it is aligned. ESD structures prevent any resulting electrostatic charge from destroying the circuitry. ESD structures prevent the electrostatic charge from destroying the circuitry. Rather than using ESD resistors, which must be scribed and broken off after assembly, ESD shorting bars could be deposited between all adjacent pads after the act in box 420; the ESD shorting bars could be removed by wet etching after assembly, as shown at right in FIG. 9.

The act in box 430 produces a passivation pattern similarly to box 422. The act in box 432 then tests and repairs as in box 424. The act in box 434, however, produces ESD shorting bars. Then, the act in box 436 assembles an LCD, removing the shorting bars after a successful assembly.

The process in FIG. 9 is only one of many processes that could be used to implement the layout of FIG. 8. Other examples that could be used are described in copending, coassigned U.S. patent applications Ser. No. 08/235,009, entitled "Electrically Isolated Pixel Element in a Low Voltage Activated Active Matrix Liquid Crystal Display and Method," and Ser. No. 08/233,190, entitled "Pixel Structure Having a Bottom-Layered Pixel Element for an Active Matrix Liquid Crystal Display and Method," both incorporated herein by reference.

FIGS. 10 and 11 show cross-sections along lines A—A and B—B in FIG. 8, respectively, for a thin-film structure produced using the process in FIG. 9. Layers of the same material are similarly shaded and bear the same reference number in the two drawings.

Substrate 450 has surface 452 at which a thin-film structure is formed, beginning with bottom metal layer 454 which in FIG. 11 forms gate line 360 and in FIG. 10 forms gate lead 368. Over bottom metal layer 454 is bottom nitride layer 460, followed by amorphous silicon layer 462, which in FIG. 10 forms the channel of a TFT. Over amorphous silicon layer 462 is top nitride layer 464, forming island 364 in FIG. 10. Over top nitride layer 464 where it exists and over amorphous silicon layer 462 elsewhere is n+ amorphous silicon layer 466, providing a source lead and a drain lead for the TFT in FIG. 10 and, together with bottom nitride layer 460 and amorphous silicon layer 462, forming a storage capacitor's dielectric in FIG. 11. Adjacent n+ layer 466 is ITO layer 468, forming transparent electrode 362 in both FIGS. 10 and 11. Over n+ layer 466 and ITO layer 468 is top metal layer 470, forming the source lead part of data line 360 and drain lead 372 in FIG. 10 and forming charging lead 374 in FIG. 11. Over top metal layer 470 and other exposed layers is passivation layer 472. Top nitride layer 464 could also be retained between bottom metal layer 454 and top metal layer 470 in FIG. 11 to provide a desired capacitance.

Product 490 in FIG. 12 illustrates features of one working implementation produced by the process of FIG. 9. The gate lines include molybdenum and chromium, and the top metal layer includes a barrier layer of chromium and a conductive layer of aluminum, as described above.

Product 490 includes substrate 492, a transparent glass sheet with outer dimensions of approximately 20 cm by 29 cm. Product 490 includes a thin-film structure formed at the surface of substrate 492 as described above. The thin-film structure includes array 494 with a diagonal of 33 cm, with a width of approximately 18.4 cm, with a length of approximately 27.6 cm, and therefore with an area of approximately 510 cm$^2$. Along the shorter sides of array 494 are scan line pads $s_1$ through $s_{2048}$ and $s'_1$ through $s'_{2048}$. Along the longer sides are data line pads $d_1$ through $d_{3072}$ and $d'_1$ through $d'_{3072}$.

As illustrated in FIG. 8, each binary control unit in array 494 is square with an area of 90 μm×90 μm, so that array 494 has binary control unit densities of approximately 111/cm in each direction. Because of the small sizes of the storage capacitors and the TFTs, each binary control unit has an aperture ratio of 26%. The scan line pads have the same density in the direction of the width and the data line pads have the same density in the direction of the length.

B.3. AMLCD Applications

Figure 21:
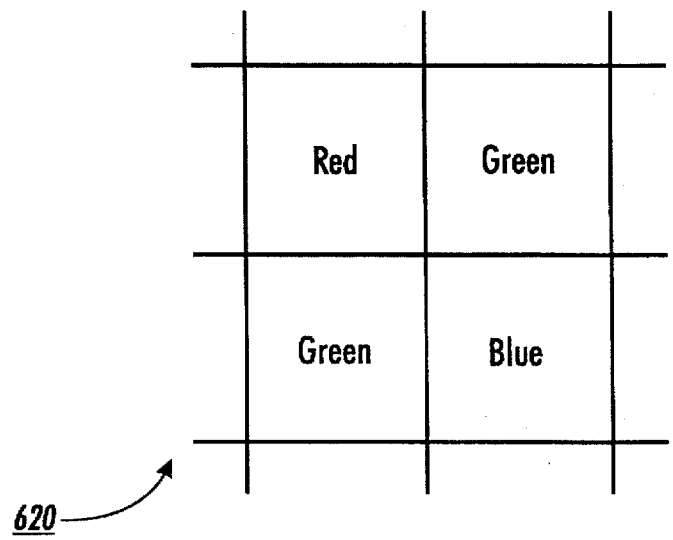
FIG. 21 is a schematic diagram of a pattern of color filter parts that can be used in the AMLCD assembly of FIG. 13.
Figure 13:
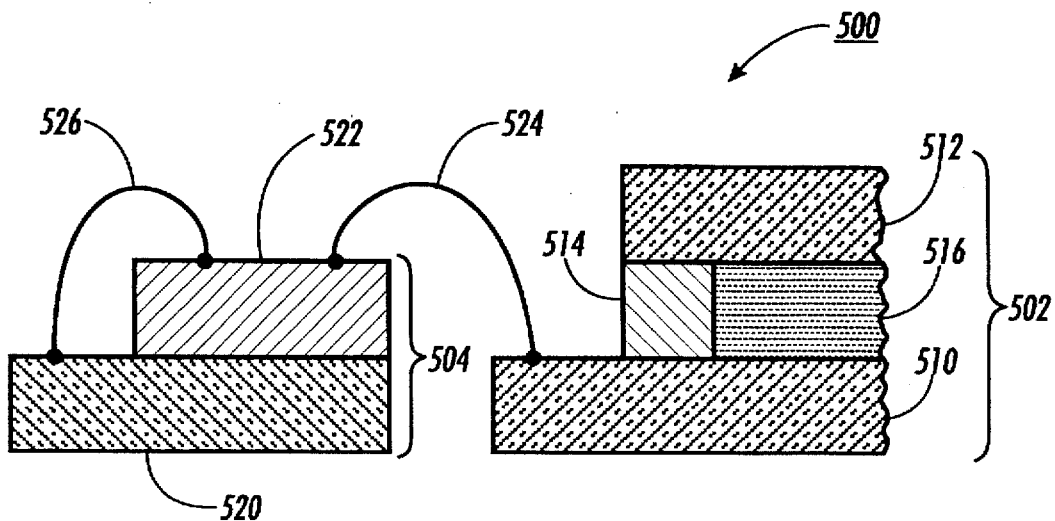
FIG. 13 is a cross-sectional view of an AMLCD assembly that includes a sheet as in FIG. 12, together with a connected driver assembly.
Figure 14:
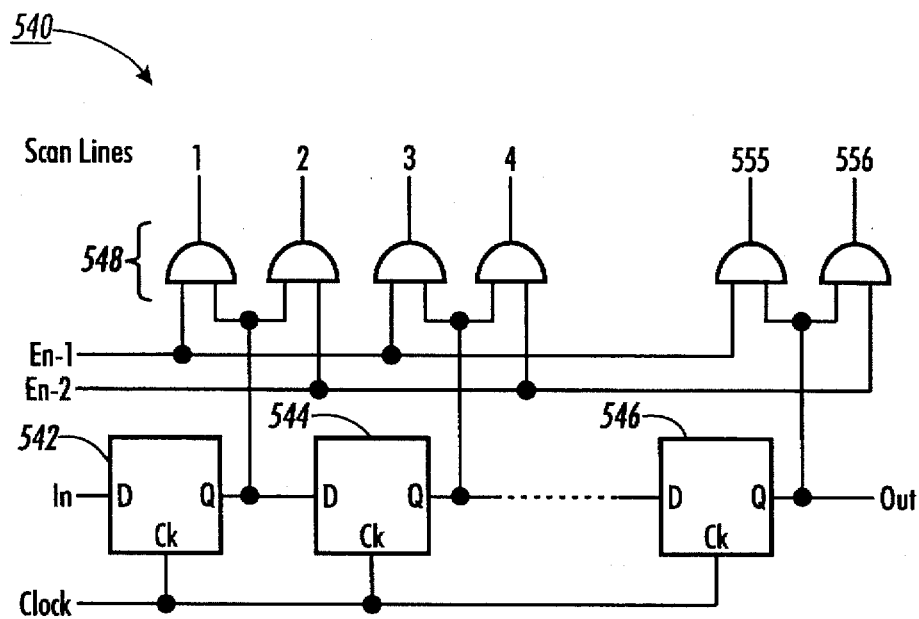
FIG. 14 is a schematic circuit diagram showing scan line signal circuitry that can be used in the driver assembly of FIG. 13.
Figure 15:
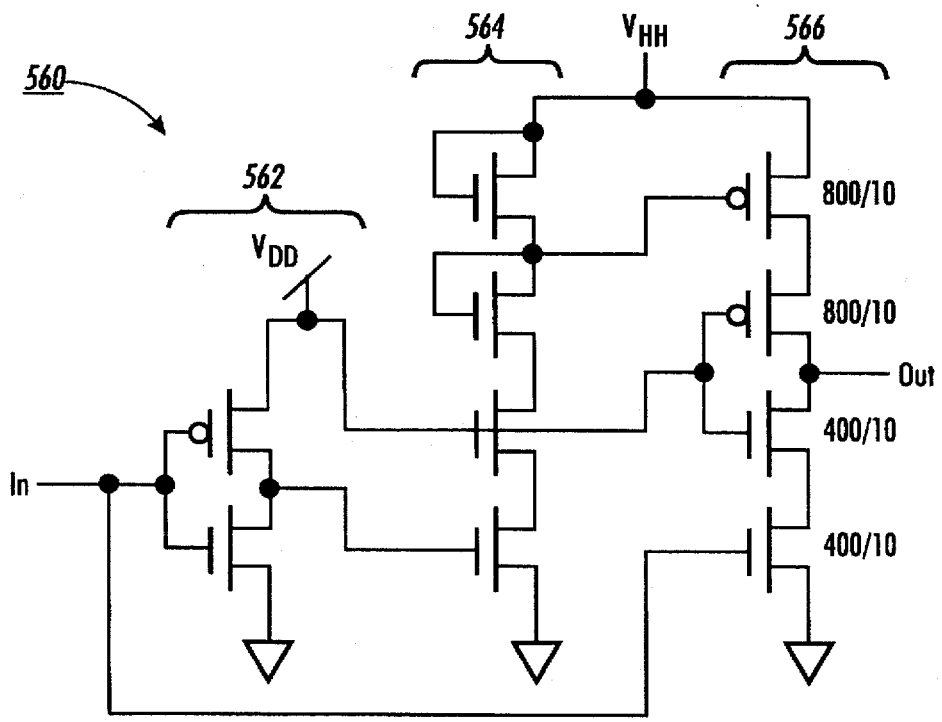
FIG. 15 is a schematic circuit diagram showing a buffer circuit that can be used as a scan line buffer with the circuitry of FIG. 14.
Figure 16:
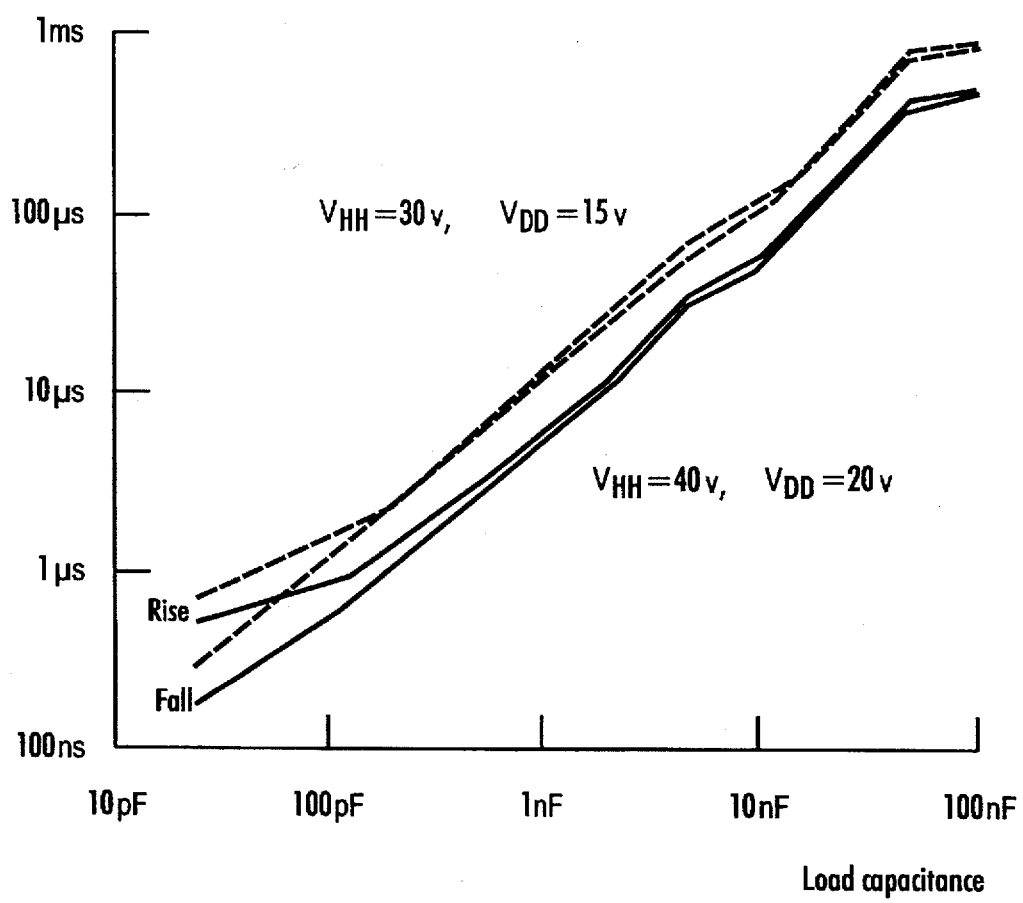
FIG. 16 is a graph showing rise and fall times for the buffer circuit of FIG. 15 as a function of load capacitance.
Figure 17:
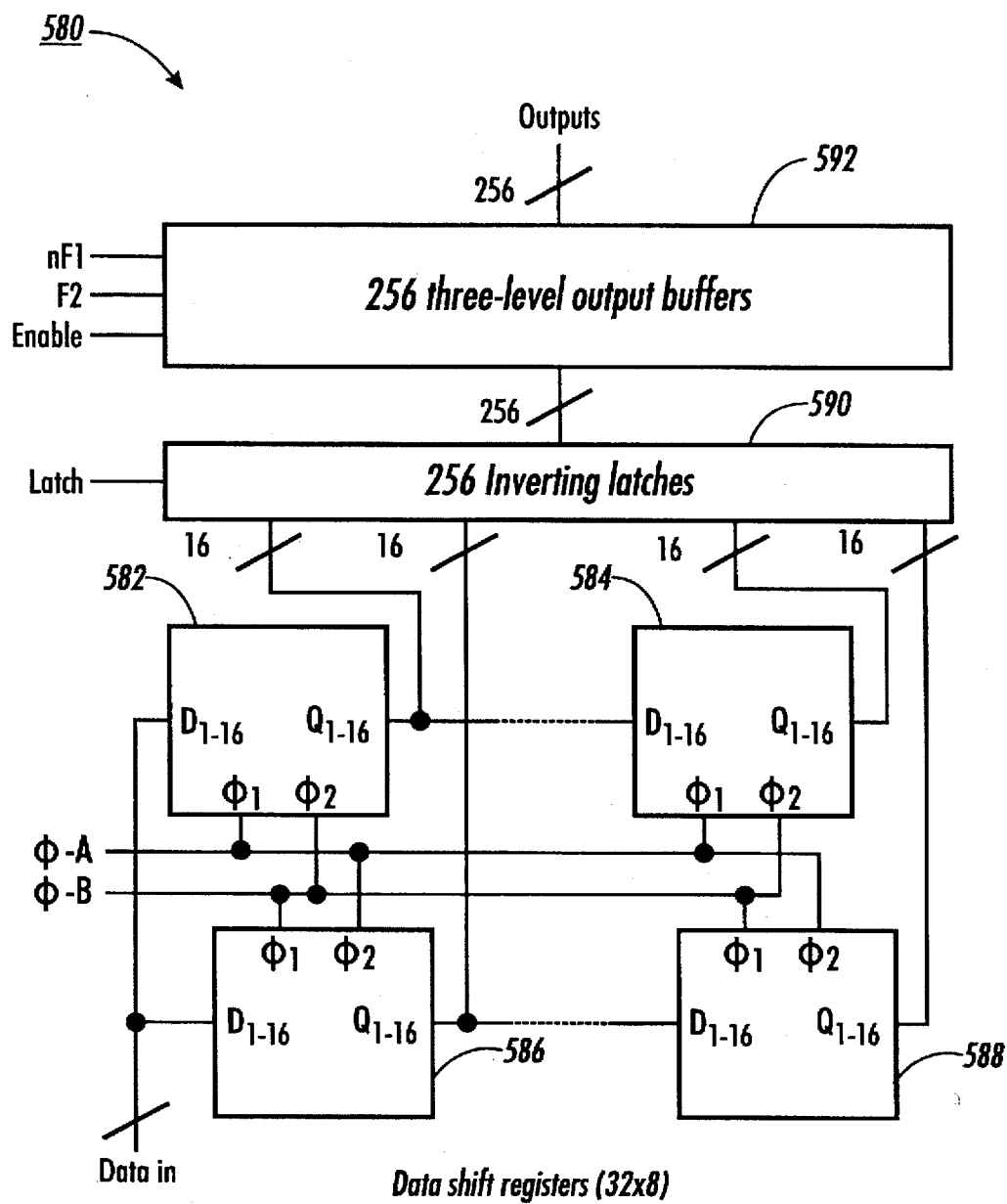
FIG. 17 is a schematic circuit diagram showing data line signal circuitry that can be used in the driver assembly of FIG. 13.
Figure 18:
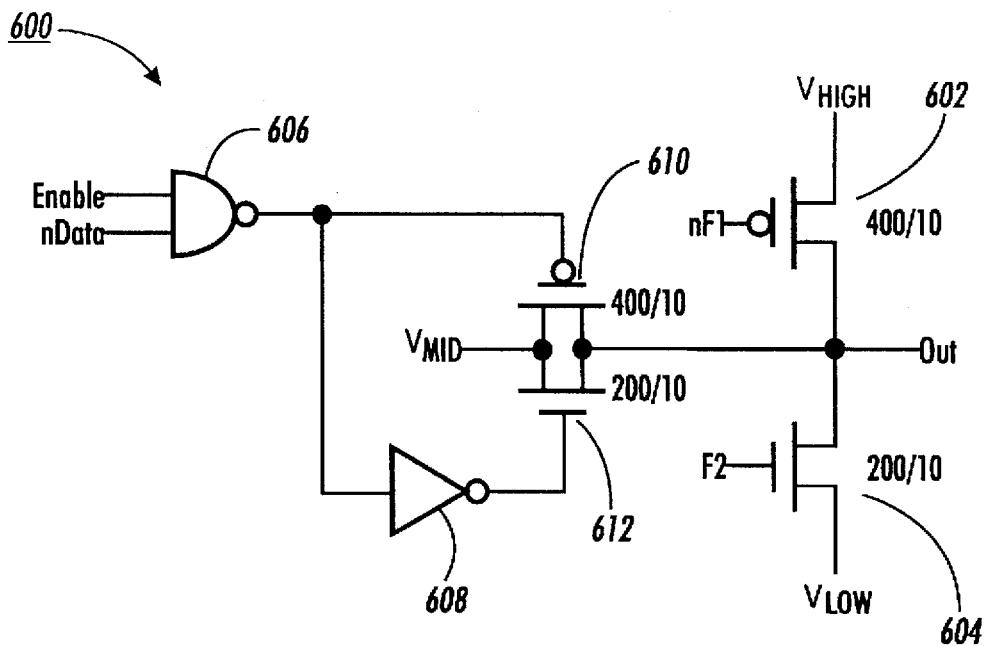
FIG. 18 is a schematic circuit diagram showing a buffer circuit that can be used to implement the output buffers in FIG. 17.
Figure 19:
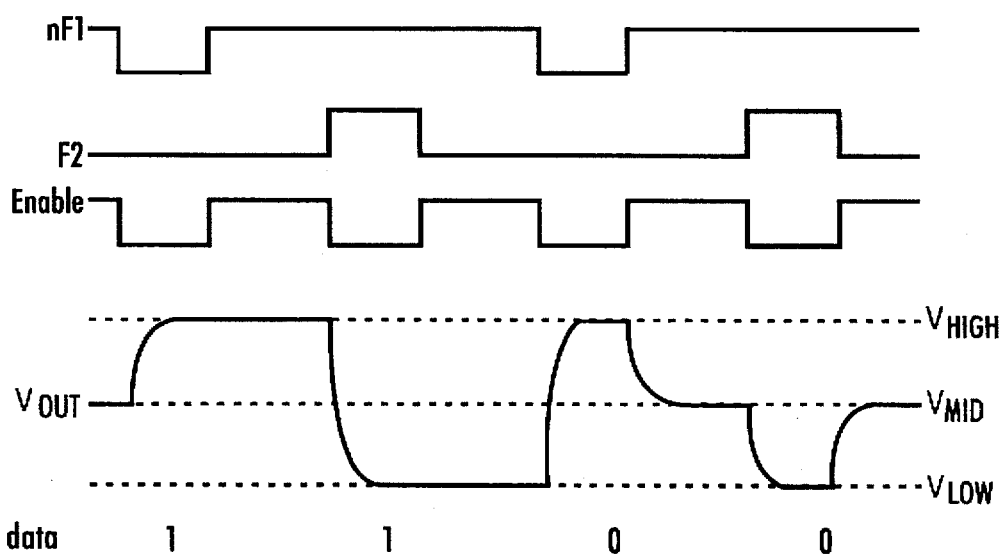
FIG. 19 is a timing diagram showing how the buffer circuit in FIG. 18 responds to its input signals.
Figure 20:
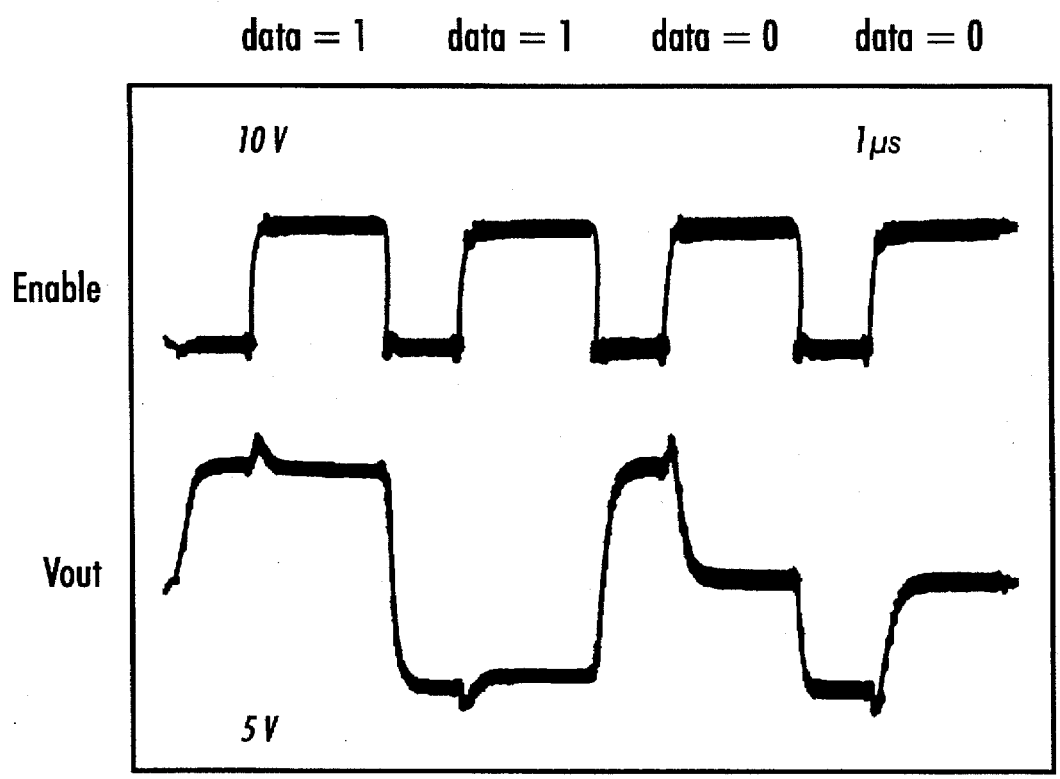
FIG. 20 is a screen image showing voltage waveforms measured at an output of a data driver chip that includes the buffer circuit of FIG. 18.

FIG. 13 shows an AMLCD assembly with a driver assembly attached. FIG. 14 shows an example of scan line signal circuitry in the driver assembly of FIG. 13. FIG. 15 shows a polysilicon TFT buffer circuit that forms the output line driver in the circuitry in FIG. 14. FIG. 16 shows rise and fall times for the buffer circuit of FIG. 15. FIG. 17 shows data line signal circuitry in the driver assembly of FIG. 13. FIG. 18 shows polysilicon TFT circuitry in output buffers in FIG. 17. FIG. 19 shows how the buffer circuit in FIG. 18 responds to its input signals. FIG. 20 shows voltage waveforms from an output of a data driver chip. FIG. 21 shows an pattern of color filter parts in a quad-green color mosaic.

Because of the high density of the array described above, display drivers that were commercially available at the time of the initial implementation were not capable of driving the array. Therefore, in order to implement an AMLCD with the array described above, it was necessary to provide appropriate driving circuitry An array with amorphous silicon TFTs requires external driver integrated circuits (ICs) to deliver the appropriate scan and data signals to the rows and columns. In one working implementation, commercially available single crystal ICs were mounted on custom multichip modules that were in turn mounted on printed circuit boards and wirebonded directly to pads on the glass substrate of the array, driving odd data lines from one side of the array and even lines from the other. In another working implementation, described below, polysilicon ICs were mounted on a printed circuit board and wirebonded directly to the pads, driving all data lines from one side of the array. Further implementations may employ commercially available single crystal TAB mounted drivers bonded to the pads, alone or in combination with polysilicon scan drivers as described below.

In FIG. 13, product 500 includes AMLCD assembly 502 and driver assembly 504. AMLCD assembly 502 includes active matrix sheet 510, cover sheet 512, spacer 514, and liquid crystal material 516 enclosed in a container defined by sheets 510 and 512 and spacer 514. Driver assembly 504 includes printed circuit board (PCB) 520 and, mounted on PCB 520, polysilicon IC chip 522. Polysilicon IC chip 522 is a customized chip with polysilicon TFT circuitry as described below and with pads that are approximately aligned in mirror image positions with pads for scan lines and data lines on active matrix sheet 510, to facilitate wirebonding. As shown, wirebond 524 connects a pad on chip 522 to a pad on sheet 510 with which it is approximately aligned, and wirebond 526 connects circuitry on chip 522 to circuitry on PCB 520.

Active matrix sheet 510 can be implemented as described above for product 490 in FIG. 12. Cover sheet 512 can be implemented similarly, but with circuitry that provides a single continuous transparent electrode opposite the binary control units on active matrix sheet 510; cover sheet 512 includes opaque regions that block light except in areas in which liquid crystal is under control of a transparent electrode on active matrix sheet 510. The transparent electrode is biased at a voltage V1 as illustrated in FIG. 7 by a connection to an external drive voltage.

Spacer 514, liquid crystal material 516, and other components of product 500 that are not shown can be implemented with conventional techniques. For example, an epoxy seal applied at the perimeter of one sheet can be mixed with small glass rods, and the sheet can also be sprayed with small plastic spheres. When sheets 510 and 512 are glued together, the small glass rods and plastic spheres act as spacers. Liquid crystal material 516 can be a twisted nematic liquid crystal chosen for high resistivity, relatively low threshold such as 2.3 V, and low birefringence. Conventional front and back polarizers and a fluorescent lamp backlight with a brightness of 1000 cd/m$^2$ can be used.

Driver assembly 504 is one of three such assemblies, two for providing scan signals on gate lines and one for providing data signals on data lines. As can be seen from array 490 in FIG. 12, the scan driver assemblies are connected to pads on the two shorter sides of array 510, while the data driver assembly is connected to pads on one of the longer sides of array 510. Except as noted below, each of the driver assemblies is similarly constructed.

In driver assembly 504, chip 522 is produced using a high temperature furnace annealing and a quartz substrate, as described in Wu, I-W., Lewis, A. G., Huang, T.-Y., and Chiang, A., "Performance of Polysilicon TFT Digital Circuits Fabricated with Various Processing Techniques and Device Architectures," SID 90 Technical Digest, 1990 pp. 307–310, incorporated herein by reference. The circuitry is fabricated on wafers following conservative, large-area design rules, maintaining a minimum linewidth of 10 µm, including TFT gate length. The circuitry on the printed circuit boards includes opto-isolators and signal level shifters to translate incoming 5 V control signals to 15–18 V signals to drive polysilicon TFT chips.

Scan line signal circuitry 540 in FIG. 14 receives a clock signal (Clock), an in shift signal (In), a first enable signal (En-1), and a second enable signal (En-2). In response, circuitry 540 provides an out shift signal (Out) and signals on scan lines 1–256. Therefore, eight chips with circuitry 540 can provide 2048 scan line signals if connected so that all receive the same Clock, En-1, and En-2 signals and if connected in series so that the Out signal from one chip is the In signal for the next chip in the series. 16 such chips can be used if the scan lines are driven from both ends.

Circuitry 540 includes 128 delay (D) flip-flops 542, 544, through 546, which form a conventional static shift register. Each of flip-flops 542, 544, through 546 provides its output to a pair of AND gates 548, one of which is enabled by the En-1 signal, the other by the En-2 signal.

The maximum shift register clock frequency required for a 30 Hz frame rate is just over 30 kHz for 2048 scan lines, which is readily achieved with polysilicon TFT circuits.

Circuitry 540 provides each of its 256 scan line signals to a scan line buffer on the same chip. FIG. 15 shows buffer circuit 560 which has been successfully used as a scan line buffer.

Because each scan line includes a TFT, a cross-over, and a storage capacitor for each of 3072 binary control units, the total capacitive load is about 500 pF. Meanwhile, the line time of 16 µsec for 30 Hz and 2048 scan lines is considerably shorter than the 70 µsec line time typical of a VGA display. Also, the scan pulse amplitude necessary to ensure adequate pixel charging is about 30 V, well above the drain breakdown voltage for polysilicon TFTs. Therefore, a simple CMOS buffer cannot be used to drive the scan lines-some form of high voltage circuit is required.

Buffer circuit 560 includes stages 562, 564, and 566. Stage 566 includes four low voltage transistors arranged in a cascode-like structure such that the gate-source and drain-source voltage appearing across any individual transistor is about half the high voltage supply VHH, which is nominally twice as great as VDD, which is 15 V. The transistors have the width/length ratios indicated. Therefore, buffer circuit 560 can achieve a 30 V swing in its output signal (Out) in response to an input signal (In) from one of AND gates 548 while limiting the voltage across any individual TFT to about 15 V. High voltage operation is achieved without special structures such as offset drains, and does not complicate the fabrication process. If the scan drivers are implemented using single crystal integrated circuits, a conventional high voltage output stage may be used.

FIG. 16 shows rise and fall times measured for buffer circuit 560 as a function of load capacitance. Transition times of a few microseconds are achieved even for loads of several hundred picofarads, and the rise and fall times remain well matched over a wide range of load capacitance.

For the data drivers, about 200 Mbits/sec of bandwidth is required to operate the display at a 30 Hz frame rate. At the same time, the output buffers must be capable of driving the capacitive load on the data lines.

Data line signal circuitry 580 in FIG. 17 receives a 16 bit wide input data signal (Data in), a first phase signal ($\phi$-A), a second phase signal ($\phi$-B), a latch signal (latch), a buffer enable signal (Enable), a first precharge signal (nF1), and a second precharge signal (F2). In response to $\phi$-A, sixteen first phase data shift registers 582 through 584 load sixteen bits of data at their inputs, while sixteen second phase data shift registers 586 through 588 provide sixteen bits of data at their outputs. In response to $\phi$-B, second phase shift registers 586 through 588 load sixteen bits of data at their inputs, while first phase shift registers 582 through 584 provide sixteen bits of data at their outputs. Signals $\phi$-A and $\phi$-B can each be provided at clock rates up to 10 MHz, so that the sixteen data shift registers together can handle input data at the rate of 320 Mbits/sec.

Once the data shift registers 582 through 584 and 586 through 588 are loaded, the data they store can be provided in parallel to inverting latches 590, which respond to the latch signal by storing all 256 bits of data. Inverting latches 590 then provide the inverted data to 256 output buffers 592, which can be implemented as shown in FIG. 18.

Buffer circuit 600 in FIG. 18 receives Enable, nF1, and F2 signals as described above, in addition to its single bit of data from inverting latches 590 (nData). FIG. 19 illustrates how buffer circuit 600 responds to these signals.

While the Enable signal is LOW during the first part of each cycle, either the nF1 signal enables transistor 602 to pull the output signal (Out) to the high on-state liquid crystal drive voltage $V_{HIGH}$ or the F2 signal enables transistor 606 to pull Out to the low on-state liquid crystal drive voltage $V_{LOW}$.

Then, when the Enable signal goes HIGH during the second part of each cycle, Out remains at $V_{HIGH}$ or $V_{LOW}$ if nData has the value 1, but discharges to a common off-state voltage $V_{MID}$ if nData is 0. This occurs because inverting AND gate 606 provides a LOW signal to inverter 608 and to transistor 610 if nData is 1, so that both of back-to-back transistors 610 and 612 remain non-conductive; if nData is 0, however, AND gate 606 provides a HIGH, and both transistors 610 and 612 become conductive, so that $V_{MID}$ is provided as the Out signal.

The second part of each cycle in FIG. 19, during which Enable is HIGH, is sufficiently long to ensure correct charging of each binary control unit's storage capacitor. FIG. 20 shows voltage waveforms measured at the 220th output of a data driver chip. Signals $\phi$-A and $\phi$-B were provided at interleaved clock rates of 10 MHz, and the effective line time, i.e. the period of the Enable, nF1, and F2 pulses, was reduced to about 2.5 µsec for convenience. The Out signal drove a load of 250 pF.

Since circuitry 580 can provide 256 bits of data in parallel, twelve chips with such circuits are necessary to provide scan lines of 3072 bits. The clock rates of signals $\phi$-A and $\phi$-B described above are high enough, however, that the data for each data driver chip can be loaded sequentially in a single line time with a 30 Hz frame rate, eliminating the need for split panel operation and the associated data reordering. The data driver chips can be loaded sequentially, with all connected to a common data input bus and each chip being enabled in turn by signals from circuitry as described in copending, coassigned U.S. patent application Ser. No. 08/235,010, entitled "Universal Display That Presents All Image Types With High Image Fidelity." The latch signals can be staggered, however, with the first six chips latched one clock cycle ahead of the second six chips so that the input data stream is continuous and does not need to be interrupted while data is transferred to the latches.

Scan drive and data driver chips as described above are produced with output pads laid out to match the pads on sheet 510. Electrical connection can then be readily achieved by automated wirebonding.

A monochrome display produced as described above has been successfully driven with data defining 6.3 million pixels of an image. Although the display includes binary control units, so that each causes presentation of a segment that is either at maximum or minimum intensity, the density of the binary control units is sufficiently high that shades of gray can be provided by spatial dithering techniques, as described in detail in copending, coassigned U.S. patent application Ser. No. 08/235,010, entitled "Universal Display That Presents All Image Types With High Image Fidelity." The monochrome display can operate with lower backlight power due to the absence of a color filter and optical efficiency of 7%. In addition, the cost of the monochrome cover sheet is much lower, reducing overall display cost.

A color display can similarly be produced as described above, except that cover sheet 512 includes a color filter patterned on its substrate, covered by a passivation layer of clear polyimide and a patterned ITO electrode. FIG. 21 shows quad-green 2×2 pattern 620 of color filter parts that has been successfully used to produce full color images. In pattern 620, two diagonally opposite parts are both green, while the other two parts are red and blue. A color filter that is a mosaic of parts with pattern 620 thus provides two green segments for each red or blue segment of an image being presented, so that the green phosphor in the backlight can be reduced, improving the color saturation of red and blue and expanding the color gamut: In each instance of pattern 620, zero, one, or two green parts can be at maximum intensity, so that pattern 620 is able to present twelve colors rather than the eight that would be available from an RGB pattern. At the same time, the color display requires a higher power backlight, like that of a conventional RGB color display, to achieve the same brightness as the monochrome display because the color filters absorb some light.

Because pattern 620 covers four binary control units, a color display as described above can be driven with data defining 1.6 million pixels of a color image. Although the display includes binary control units, so that each causes presentation of a segment that is either at maximum or minimum intensity, the density of the binary control units is sufficiently high that a full gamut of colors can be provided by spatial dithering techniques, as described in detail in copending, coassigned U.S. patent application Ser. No. 08/235,010, entitled "Universal Display That Presents All Image Types With High Image Fidelity."

Demonstrations of the monochrome and color displays described above to industry representatives have evoked expressions of surprise at the image quality obtained.

One apparent source of image quality is the uniformity obtained by using binary control units rather than multi-level light control units such as gray scale units. A display with binary control units provides excellent viewing angle, because the binary control units are either driven fully on or fully off. Each part of the liquid crystal cell therefore operates in a part of its transfer curve in which variations in voltage produce only minimal variations in light transmission. In addition, the relative cell transmission at each end of a scan line is the same, a result very difficult to achieve in a gray scale display due to gate delay and other sources. Experimental results indicate that uniform brightness can be obtained with binary control units even with line resistances up to 70 KOhms, so that non-shunted gate lines can be used even for short line times.

The binary control units also provide cost and efficiency advantages. The drivers for a binary display are less expensive than gray scale drivers, and other circuitry can be simplified. For example, a very narrow TFT and a small storage capacitor can be used to obtain higher yield and larger aperture ratio and a non-self-aligned island can be used for high light immunity. A display with binary control units has lower data bandwidth, simplifying the data interface to the display. Binary control units eliminate the need to correct variations in liquid crystal cell characteristics due to temperature, because the liquid crystal can be driven well into saturation.

The high quality of images presented by the monochrome display also results from its high resolution as well as its brightness. High quality images have been demonstrated with dithered gray scale and with graphics that include single pixel wide lines. The monochrome display can accurately simulate an image that might be produced by a given printer and can show very detailed maps. The monochrome display can present text images with very small fonts, and can display a large amount of readable text at once. The monochrome display can display binary features, gray scale, and full color all in a single image.

The high quality of images presented by the color display benefits from the square shape of the mosaic pattern, as shown in FIG. 21. The green-quad mosaic gives especially good image quality for line graphics and also renders natural scenes very well.

B.4. Variations

The implementations described above could be changed in many ways within the scope of the invention.

The above implementation include an array of binary control units with a diagonal of 33 cm and an area of approximately 510 cm$^2$, with square binary control units 90 µm on a side, with 2048×3072 binary control units in the array, and hence with densities of approximately 111/cm. The invention could be implemented with a wide variety of array sizes and shapes, binary control unit size and shapes, and binary control unit densities. For example, densities of 60/cm, 80/cm, and 100/cm could be appropriate. The invention could be implemented, for example, with much larger numbers of binary control units, such as 16 or 21 million.

The above implementations include a monochrome display without a color filter and a color display with a quad-green mosaic color filter, but a monochrome color filter could be used to obtain a monochrome display with any desired hue and a mosaic pattern other than quad-green could be used to obtain a color display.

What is claimed:

1. A digital printer for printing images in response to full-frame, two-dimensional digital image data input from an outside source, said digital printer comprising:

a two dimensional backlight for producing full frame illumination in a single flash;

a photoreceptor sensitive to light emanating from said backlight;

a two-dimensional, transmissive light valve disposed between said backlight and said photoreceptor so that light from said backlight is transmitted through said light valve to produce a full-frame, two dimensional image on said photoreceptor in response to a single flash of the backlight, said full-frame, two dimensional_image corresponding to a pattern formed on said light valve in response to said full-frame, two dimensional_digital image data;

an imaging system disposed between said light valve and said photoreceptor, such that said imaging system focuses said full-frame, two dimensional_image onto said photoreceptor; and a driver coupled to said light valve, said backlight and said outside source, said driver coupling said full-frame, two dimensional digital image data from said outside source to said light valve and synchronizing said backlight with said light valve such that said backlight flash exposes said light valve after said pattern is set on said light valve in response to said full-frame, two dimensional digital image data.

2. The digital printer as recited in claim 1 wherein said driver further comprises:

a light valve driver coupled to said light valve to provide said digital image data;

a backlight driver coupled to said backlight to control flash exposure; and a means for synchronizing said light valve driver and said backlight driver such that said backlight flash exposes only when said light valve has set said pattern.

3. The digital printer as recited in claim 1 wherein said imaging system comprises a lenslet array.

4. The digital printer as recited in claim 3 wherein said lenslet array comprises an array of spherical lenses surrounded by areas of opaque material.

5. The digital printer as recited in claim 3 wherein said lenslet array comprises an array of proximate lenses having edge-to-edge contact.

6. A digital printer as recited in claim 1 wherein said photoreceptor further comprises a moving belt.

7. A digital printer as recited in claim 6 wherein said backlight produces light for a period of time such that a blur of said image on said photoreceptor is within a predefined tolerance.

* * * * *